United States Patent [19]
Kosaka

[11] Patent Number: 5,570,342
[45] Date of Patent: Oct. 29, 1996

[54] DISK CARTRIDGE WITH TWO SLIDABLE SHUTTER MEMBERS

[75] Inventor: Katsuki Kosaka, Kanagawa, Japan

[73] Assignee: Sony Corporation, Tokyo, Japan

[21] Appl. No.: 527,360

[22] Filed: Sep. 12, 1995

[30] Foreign Application Priority Data

Sep. 14, 1994 [JP] Japan ................................. 6-219686

[51] Int. Cl.⁶ .................................................. G11B 23/03
[52] U.S. Cl. ........................................... 369/291; 360/133
[58] Field of Search ................................. 369/291, 77.2; 360/133

[56] References Cited

U.S. PATENT DOCUMENTS

| 4,608,681 | 8/1986 | Shiosaki | 369/77.2 |
| 4,682,322 | 7/1987 | Ohta | 369/291 |
| 4,695,911 | 9/1987 | Loosen | 360/133 |
| 4,724,962 | 2/1988 | Watanabe et al. | 206/444 |
| 4,799,121 | 1/1989 | Takahashi | 360/133 |
| 4,807,079 | 2/1989 | Takahashi | 360/133 |
| 5,048,008 | 9/1991 | Haryna | 369/291 |
| 5,093,823 | 3/1992 | Orwekerk et al. | 369/291 |
| 5,153,801 | 10/1992 | Ikebe et al. | 360/133 |
| 5,278,717 | 1/1994 | Sasaki et al. | 360/133 |

FOREIGN PATENT DOCUMENTS

| 579148 | 1/1994 | European Pat. Off. | 360/133 |
| 58-212665 | 12/1983 | Japan | 369/291 |
| 61-000983 | 1/1986 | Japan | 369/291 |

Primary Examiner—Robert S. Tupper
Assistant Examiner—Paul J. Ditmyer
Attorney, Agent, or Firm—Limbach & Limbach L.L.P.

[57] ABSTRACT

A disk cartridge, such as a magneto optical disk cartridge, has first and second shutters for opening and closing a center hole and a plurality of pickup holes, and a drive mechanism for causing the shutters to moves toward each other to close the holes and to move away from each other to open the holes. The drive mechanism comprise a first slide rack joined with the first shutter, a second slide rack joined with the second shutter, and a pinion rotatably mounted in a case of the cartridge and engaged with both of the first and second racks so that a movement of one of the racks in one direction causes a movement of the other rack in the opposite direction.

18 Claims, 22 Drawing Sheets

810 ns 5,570,342

DISK CARTRIDGE WITH TWO SLIDABLE SHUTTER MEMBERS

BACKGROUND OF THE INVENTION

The present invention relates to a disk cartridge enclosing a disk such as a magneto optical disk.

A conventional magneto optical disk cartridge encloses a rewritable magneto optical disk of 130 mm in diameter (5.25 inches), for example, in an approximately square flat case. The disk cartridge has a pickup hole for receiving an optical pickup on one side, and an external magnetic field hole for receiving an external magnetic field for recording and erasing on the opposite side at a position confronting the pickup hole. These holes on both sides of the cartridge are closed by a single U-shaped shutter.

However, this conventional shutter arrangement is not necessarily adequate for a magneto optical disk system of a type requiring a plurality of pickup holes in the disk cartridge. In order to increase the recording density in a system of a large-diameter magneto optical disk in which information is recorded at a revolving speed held constant, for instance, a plurality of pickup holes are required for recording and erasing of an inner annular area of the recording surface and for recording and erasing of an outer annular area so as to reduce the nonuniformity in density. In such a multi-perforated disk cartridge, it is difficult to open and close the pickup holes with only one shutter. Two conceivable arrangements to solve this problem are a multi-slide type and a rotary type. In the multi-slide type, however, a mechanism for sliding two or more shutters in combination is complicated and requires many constituent parts. In the rotary shutter, the support for rotation of the shutter must be provided around the center hole of the cartridge for receiving a turntable (a spindle motor). Therefore, this type requires another shutter for closing the center hole in addition to the rotary shutter for closing the pickup holes, and a complicated mechanism for moving both shutters in an interlocking manner.

SUMMARY OF THE INVENTION

It is therefore an object of the present invention to provide a disk cartridge with a compact, reliable and uncomplicated arrangement for easily and smoothly sliding a pair of shutters to open and close a plurality of pickup holes.

According to the present invention, a disk cartridge comprises a case enclosing a rotatable disk such as a magneto optical disk, first and second shutters slidably mounted on the case, and a drive means or mechanism for opening and closing the shutters.

The case comprises a first main side, such as a lower side, formed with a center hole opening to a center of the rotatable disk to receive a turntable, and a plurality of pickup holes for receiving pickups such as optical pickups. For example, four of the approximately rectangular pickup holes are arranged radially around the circular center hole.

The first and second shutters are slidable for opening and closing the center hole and the pickup holes.

The drive means includes a mechanism for transmitting motion from one point to another point, and is arranged to cause the first and second shutters to slide away from each other to open the center and pickup holes, and toward each other to close the center hole and the pickup holes when the disk cartridge is inserted in and ejected from a slot of a recording and reproducing apparatus. The drive means comprises a first slide rack which is slidably mounted in the case and joined with the first shutter, a second slide rack which is slidably mounted in the case and joined with the second shutter, and a pinion interposed between said first and second slide racks.

With the drive mechanism of the racks and pinion, the opening and closing operations of the shutters are easy and reliable. Beside, the drive mechanism is low in the number of required component parts and uncomplicated in construction.

DETAILED DESCRIPTION OF THE INVENTION

Figure 23:
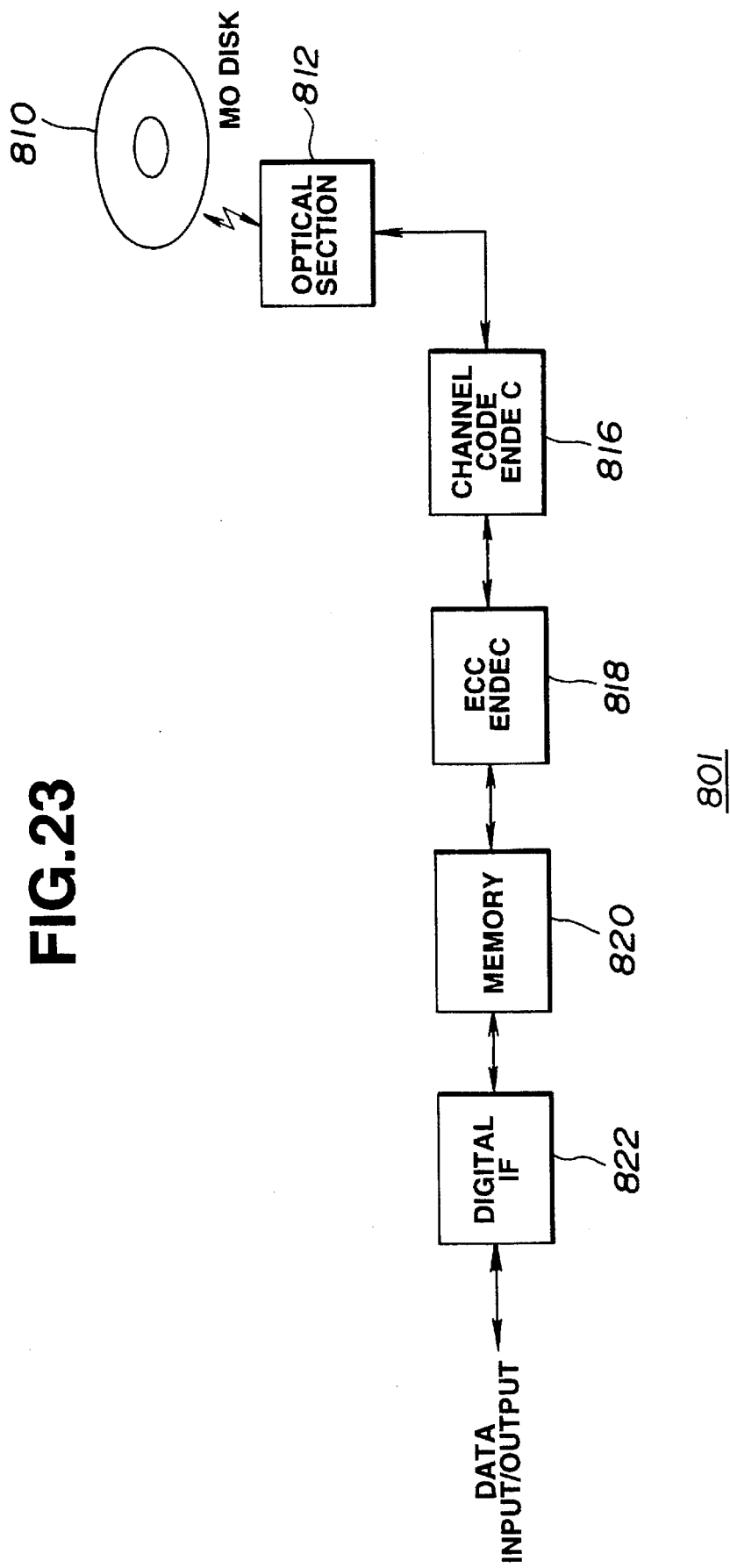
FIG. 23 is a schematic view showing a recording and reproducing apparatus usable in the present invention.
Figure 24:
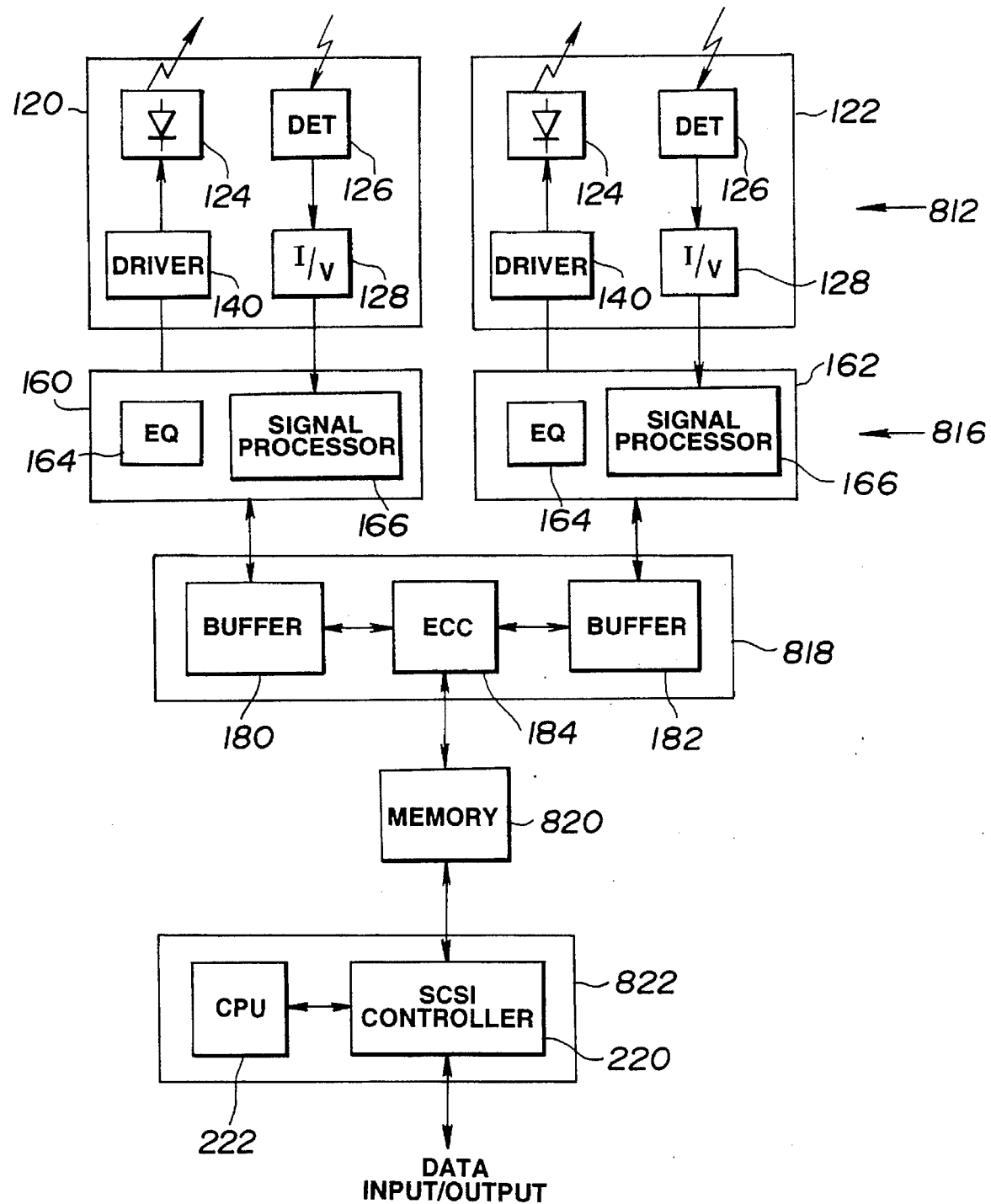
FIG. 24 is a block diagram showing the recording and reproducing apparatus shown in FIG. 23 more in detail.
Figure 25:
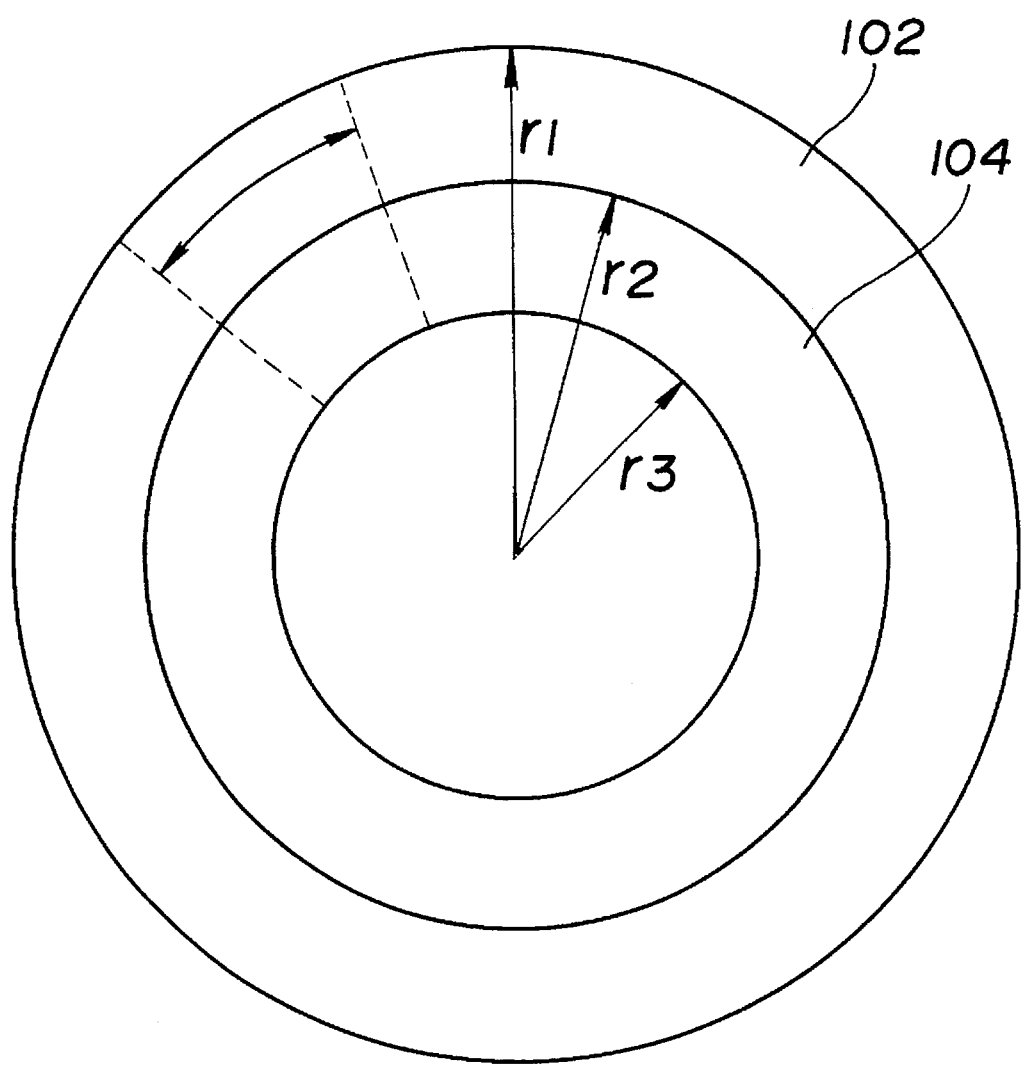
FIG. 25 is a schematic view showing outer and inner recording areas of a magneto optical disk usable in the present invention.

FIGS. 23–25 show a recording and reproducing apparatus 801 and an magneto optical disk (MO disk) 810 which can be employed in the present invention.

As shown in FIGS. 23 and 24, the data recording and reproducing apparatus 801 of this example comprises an optical section 812, an encoding and decoding section (channel code ENDEC) 816, an ECC generating and correcting section (ECC ENDEC), a memory section 820, and a digital interface section (digital IF circuit) 822.

As shown in FIG. 25, the MO disk 810 has a circular recording surface which is divided into an outer recording area 102 bounded between an outer circle of a largest radius r1, and a concentric intermediate circle of a medium radius r2, and an inner recording area 104 bounded between the intermediate circle and a concentric inner circle of a smallest radius r3. A relationship among the radii r1, r2 and r3 is 5:3:2, for example.

The recording and reproducing apparatus 801 has two parallel recording and reproducing branches for performing recordation or reproduction of data in the outer and inner recording areas 102 and 104 of the MO disk 810 revolving at a constant angular speed, simultaneously.

As shown in FIG. 24, the optical section 812 comprises first and second parallel recording and reproducing subsections 120 and 122 corresponding, respectively, to the outer and inner recording areas 102 and 104 of the MO disk 810. Each subsection 120 or 122 comprises a laser diode (LD) 124, a laser drive circuit 140, a light detecting circuit (DET) and a current to voltage converting circuit (I/V circuit) 128.

The encoding and decoding section 816 comprises first and second encoding and decoding circuits 160 and 162 corresponding, respectively, to the first and second subsections 120 and 124 of the optical section 812. Each circuit 160 or 162 comprises an equalizer circuit 164 and a signal processing circuit 166.

The ECC generating and error correcting section 818 comprises first and second buffer circuits 180 and 182 corresponding, respectively, to the first and second circuits 160 and 162 of the encoding and decoding section 816. The section 818 further comprises an ECC generating and error correcting circuit 184.

The digital IF section 822 comprises an SCSI controller 220 and a control circuit (CPU) 222.

The laser diodes LD 124 radiate laser beams to the outer and inner areas 102 and 104 of the MO disk 810, respectively, under the control of the respective driver circuits 140. The optical detecting circuits 126 detect laser beams reflected from the outer and inner areas 102 and 104 of the disk 810, respectively. Each of the I/V circuits 128 receives a current signal resulting from detection of the laser beam by the corresponding detecting circuit 126, converts the input current signal into a voltage signal, and outputs the voltage signal to the corresponding one of the encoding and decoding circuits 160 and 162.

The equalizer circuits 164 of the encoding and decoding circuits 160 and 162 equalize the waveforms of the voltage signals inputted from the I/V circuits 128, respectively.

The signal processing circuits 166 demodulate the equalized voltage signals and convert the input signals to the digital signals by decoding of RLL (1, 7), for example, and send the digital signals to the ECC generating and error correcting section 818 as reproduced data. Furthermore, the signal processing circuits 166 receive digital record data from the ECC generating and correcting section 818, perform RLL (1, 7) encoding and modulating operations on the input record data, and deliver the resulting signals to the respective laser drive circuits 140. With the encoding and decoding circuits 160 and 162, the signal characteristics are adjusted and matched between the ECC generating and error correcting section 818 and the recording and reproducing subsections 120 and 122, so that efficient recording and reproducing is possible in the recording areas 102 and 104 of the MO disk 810.

The buffer circuits 180 and 182 temporarily store the record data to be outputted to the respective encoding and decoding circuits 160 and 162, and the reproduction data inputted from the respective encoding and decoding circuits 160 and 162.

The ECC generating and error correcting circuit 184 generates one or more error correcting codes (ECC) from input data inputted from the memory circuit 820, inserts the codes in the input data, and apportions the input data containing the error correcting codes between the buffer circuits 180 and 182 so that each of the shares is proportional to the smallest radius of the corresponding recording areas 102 or 103.

The ECC generating and error correcting circuit 184 further performs an error correcting operation on the reproduced data by using the ECCs contained in the reproduced data inputted from the encoding and decoding circuits 160 and 162, and delivers the corrected data to the memory circuit 820.

The memory circuit or section 820 stores the reproduced data from the ECC generating and error correcting circuit 184 and the input data from the digital IF section 822.

The SCSI controller 220 of the digital interface section 822 receives the input data from the outside, delivers the input data to the memory circuit 820, rearranges the reproduced data stored in the memory circuit 820 in original order, and delivers the rearranged data to the outside according to the SCSI protocol under the control of the CPU 222.

In the thus-constructed recording and reproducing apparatus 801, a recording operation is performed as follows:

From an external device such as a computer, input data is inputted to the digital IF section 822 sequentially. The digital IF section 822 receives the input data according to the SCSI protocol and stores the input data in the memory section 820.

The ECC generating and error correcting circuit 184 produces the ECC codes from the input data, inserts the ECC codes in the input data, and assigns the amounts of input data including the ECC codes approximately proportional, respectively, to the minimum radii of the recording areas 102 and 104 of the MO disk 810, to the buffer circuits 180 and 182. Each buffer circuit 180 or 182 stores its portion of the input data as record data.

In this example, the ratio of the minimum radius r2 of outer annular area 102 to the minimum radius r3 of the inner annular area 104 shown in FIG. 25 is 3:2. Therefore, the ECC generating and error correcting circuit 184 allots about ⅗ of the ECC bearing input data to the outer annulus 102, and about ⅖ to the inner annulus 104. When, for example, ECC-inserted input data blocks D1–D5 are inputted to the ECC generating and error correcting circuit 184, the circuit 184 stores the data blocks D1–D3 in the buffer circuit 180 and the data blocks D4 and D5 in the buffer circuit 182.

Each of the encoding and decoding circuits 160 and 162 reads out the record data from the corresponding buffer circuit 180 or 182 at a data rate of recording in the recording area 102 or 104, performs multiplexing and encoding operations in conformity with a predetermined recording format by the RLL (1, 7) encoding technique, performs a modulating operation, and delivers the data to the recording and reproducing circuit 120 or 122.

The recording and reproducing subsection 122 records the record data in the recording area 104 at a predetermined data rate, and the recording and reproducing subsection 120 records the record data in the recording area 102 at a data rate which is 1.5 times as high as the rate of the subsection 122.

In this case, the recording wavelength in each recording area 102 or 104 is determined by the revolving speed of the MO disk 810 and the data rate. In the case of a CAV type disk unit of a constant angular speed, accordingly, the recording wavelength become shortest at the innermost circumference of each recording area. Therefore, it is possible to make the recording density highest by choosing a data rate exceeding a limit value of the recording wavelength of the MO disk 810 and the optical section 812 at the innermost circumference of each recording area.

When the data rate and the data quantity assigned to each recording area 102 or 104 are substantially proportional to the minimum radius, a highest density recording is possible to the MO disk 810. Furthermore, recording times in the recording areas 102 and 104 are equal, so that the highest speed data recording and reproducing performance becomes possible.

FIGS. 1–19C show a disk cartridge according to a first embodiment of the present invention.

A disk cartridge 1 shown in FIGS. 1–6 and 15–18 includes at least a case 2 enclosing a disk 30, and front and rear shutters 40. The disk 30 in this example is the magneto optical disk 810 show in FIG. 25. For example, the magneto optical disk has a diameter of 200 mm (8 inches), and information can be recorded and erased on one side of the disk. The circular disk 30 is rotatable in the case 2. The case 2 is substantially in the form of a thin rectangular parallelepiped (or cuboid) having upper and lower broad main surfaces shaped approximately like a square, left and right narrow surfaces, and front and rear narrow surfaces. The case 2 is approximately in the shape of bilateral symmetry which can be divided by an imaginary longitudinal center plane or median plane into approximately equivalent left and right halves.

The case 2 of this example is constituted of lower and upper half shells 10 and 20 which are fastened together by a plurality of screw fasteners 3. Each of the lower and upper half shells 10 and 20 is made of synthetic resin. The upper and lower broad surfaces of the case 2 are formed, respectively, by the upper and lower half shells 20 and 10.

Figure 9:
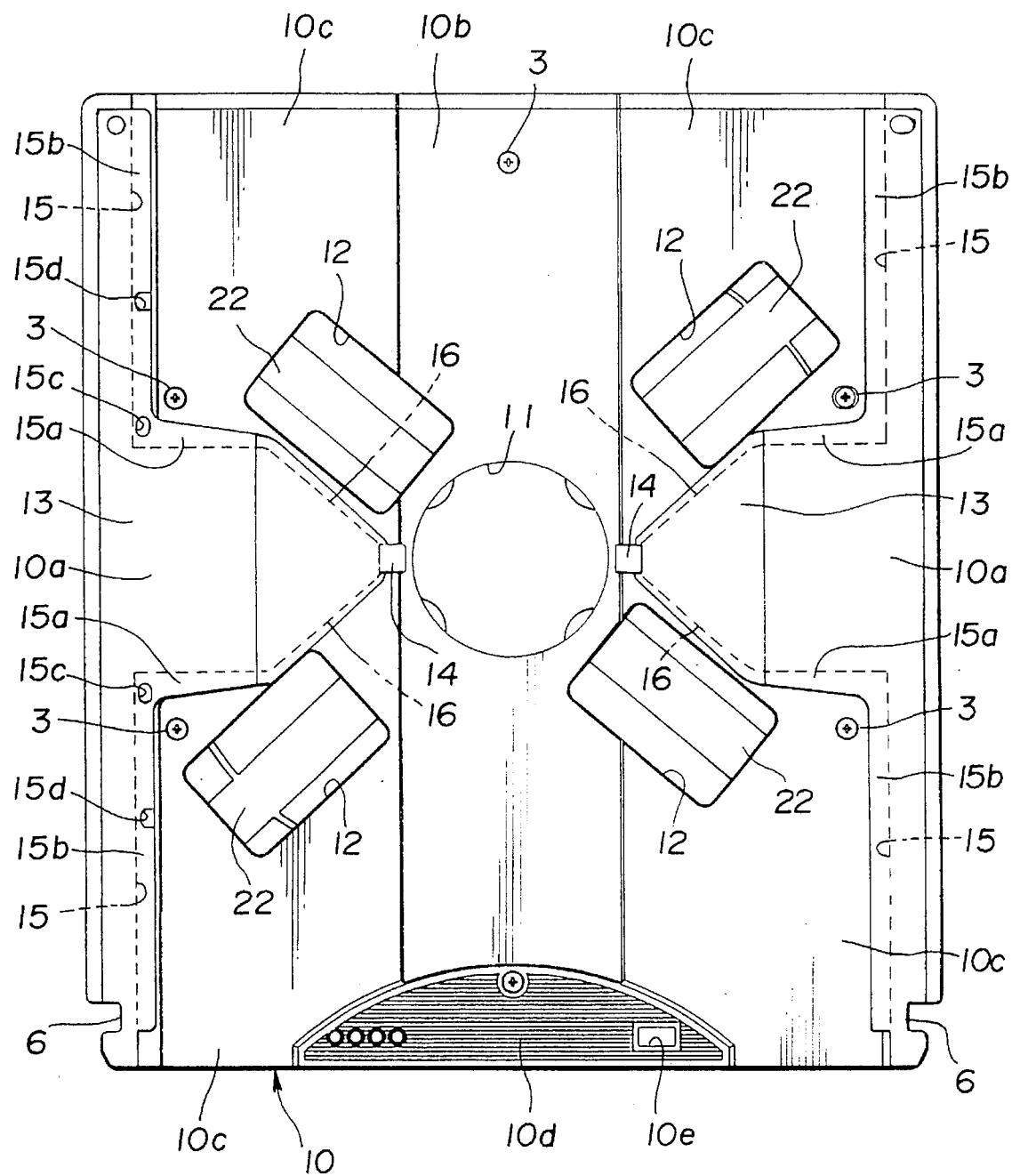
FIG. 9 is a bottom view showing a case of the disk cartridge shown in FIG. 1.

The lower half shell 10 has a center hole 11 at the center and a plurality of pickup holes 12. The center hole 11 is a circular hole for receiving a center part of a turntable of the recording and reproducing apparatus. In this example, there are four of the pickup holes 12 each of which is designed for insertion of an optical pickup of the recording and reproducing apparatus. The pickup holes 12 are rectangular, and arranged radially around the center hole 11. Two of the pickup holes 12 are elongated and aligned in an imaginary first oblique line, and the other two are in an imaginary second oblique line which intersects the first oblique line at the center of the circular center hole 11 in an imaginary horizontal plane which is parallel to a rotating plane in which the disk 30 rotates. In the imaginary horizontal plane, each oblique line extends in a direction halfway between a front and rear (longitudinal) direction of the case 1 (along the longitudinal center plane) and a left and right (lateral) direction of the case (along the lateral center plane). On each oblique line, the two pickup holes 12 confront each other across the center hole 11. The separation between the two pickup holes 12 on one of the first and second oblique lines is smaller than the separation between the two pickup holes 12 on the other oblique line as shown in FIG. 9.

The front and rear shutters 40 are so arranged as to open and close the center hole 11 and the pickup holes 12 of the lower half shell 10. The shutters 40 of this examples are made of sheet metal, and slidably mounted on the lower half shell 10.

Figure 4:
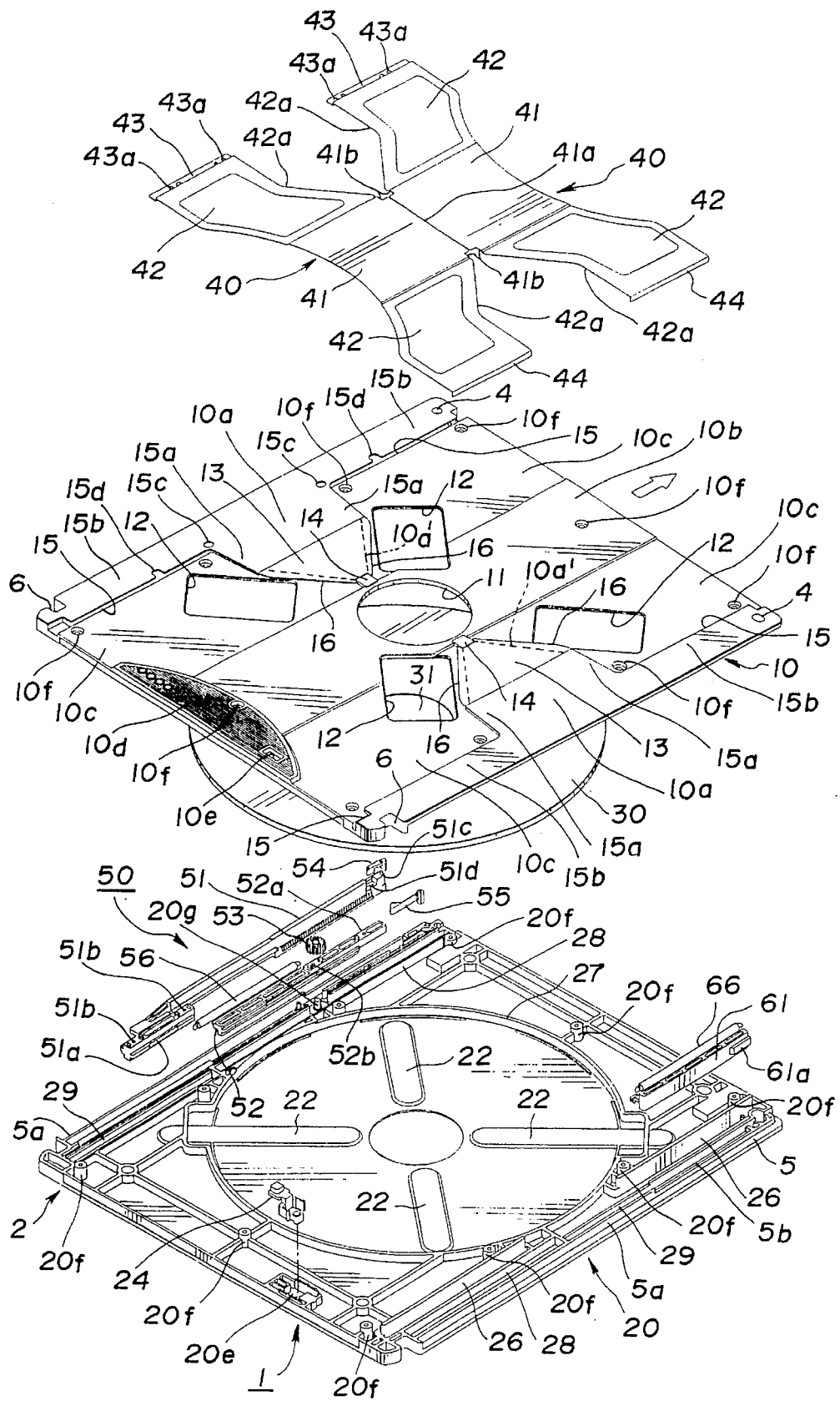
FIG. 4 is an exploded perspective view of the disk cartridge of FIG. 1.
Figure 10:
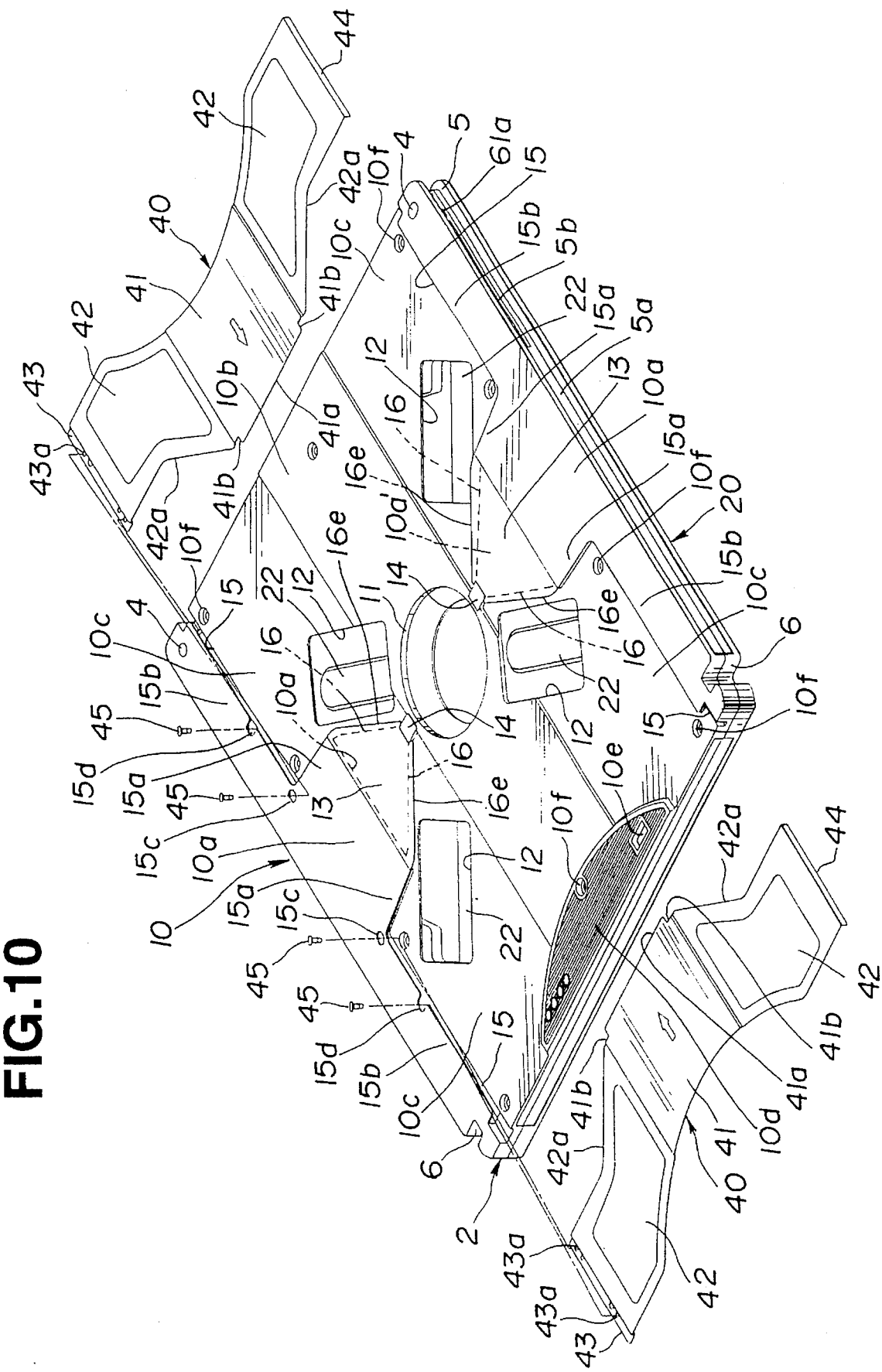
FIG. 10 is a perspective view illustrating the manner in which shutters are mounted on the case of the disk cartridge of FIG. 9.

As shown in FIGS. 4 and 9–12, in the outside surface of the lower half 10, there are formed left and right raised portions 10a and a center raised guide portion 10b extending along a longitudinal center line between the left and right raised portions 10a. The longitudinal center line is an imaginary line along which the imaginary longitudinal center (or median) plane intersects the imaginary horizontal plane. These portions 10a and 10b are all integral parts of the lower half shell 10. The center raised guide portion 10b is designed to guide the shutters 40, and extends from the front end of the lower half shell 10 toward the rear end along the longitudinal, front and rear, direction along which the shutters 40 are slidable. The center guide portion 10b is raised but slightly lower than the left and right raised portions 10a. The center hole 11 is formed in the center guide portion 10b. The left and right raised portions 10a extend along the left and right edges of the lower half shell 10, respectively, from the front end to the rear end of the lower half shell 10. The left and right raised portions 10a are in the form of a letter H split into left and right halves. That is, each of the left and right raised portions 10a includes a longitudinal section extending along the longitudinal center line, and a middle section extending from the middle of the longitudinal section, toward the center hole 11. As shown in FIGS. 4 and 10, the middle section of each of the left and right raised portions 10a has a triangular end subsection 10a' whose dimension along the longitudinal direction is tapered toward the center guide portion 10b. The triangular end subsection 10a' on each of the left and right sides is depressed and covered with a triangular plate 13 of synthetic resin having a triangular shape which is slightly greater in size than the triangle of the triangular end 10a'. The triangular plate 13 on each side is fastened to the triangular end 10a' by melt welding or boding with adhesive. In the outside surface of the lower half shell 10, there are further formed four depressed portions 10c bounded by the left and right raised portions 10a and the center guide raised portion 10b. The depressed portions 10c are lower than the center guide portion 10b.

Figure 5:
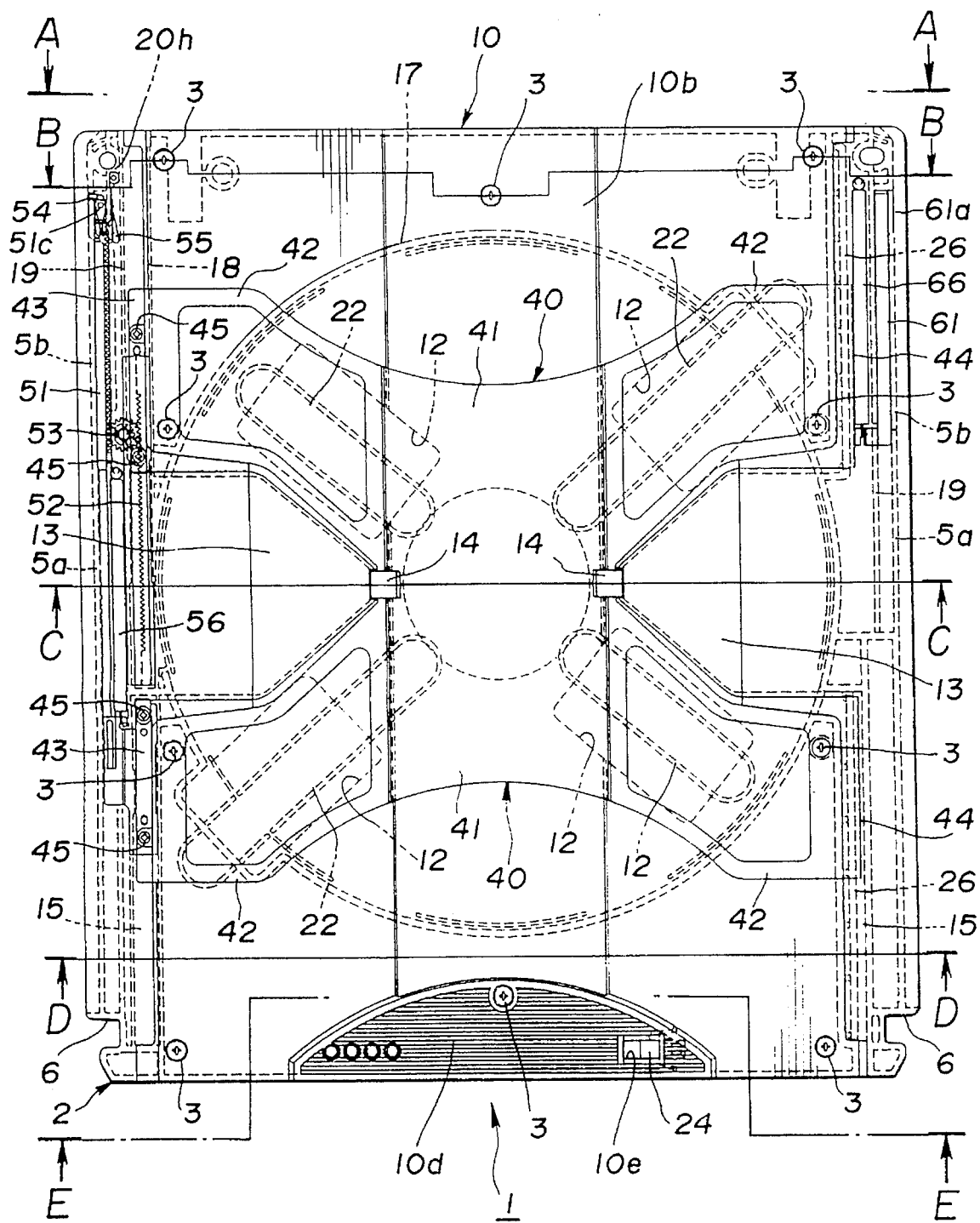
FIG. 5 is a bottom view of the disk cartridge of FIG. 1.
Figure 6A:
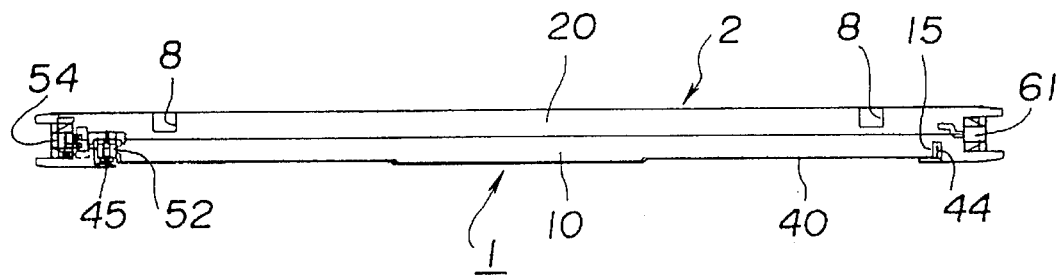
FIG. 6A is a view of the disk cartridge of FIG. 1 as viewed from a direction A shown in FIG. 5.
Figure 6B:
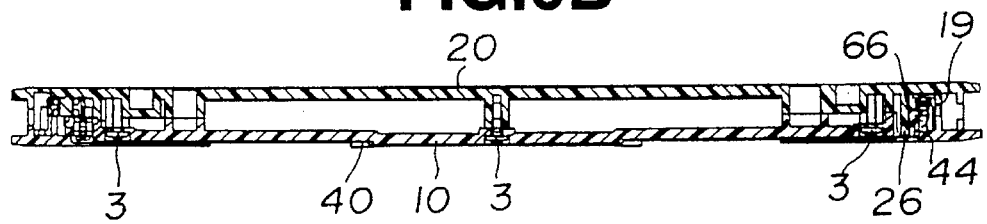
FIG. 6B is a sectional view taken across a line B—B shown in FIG. 5.
Figure 6C:
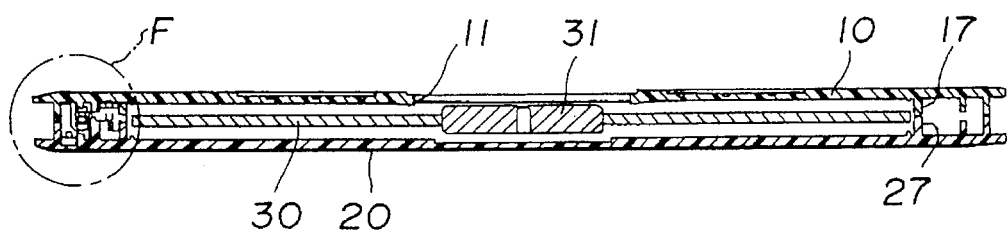
FIG. 6C is a sectional view taken across a line C—C shown in FIG. 5.
Figure 6D:
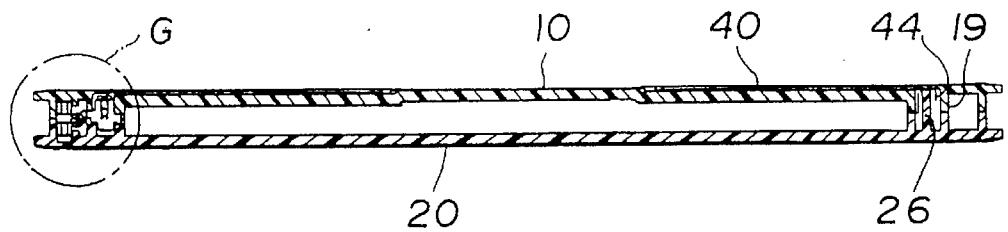
FIG. 6D is a sectional view taken across a line D—D shown in FIG. 5.
Figure 6E:
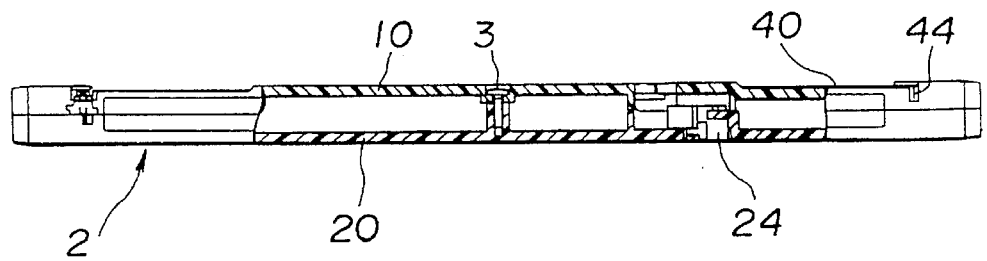
FIG. 6E is a sectional view taken across a line E—E shown in FIG. 5.

Left and right shutter stoppers 14 are integrally formed in the outside surface of the lower half shell 10. Each stopper 14 is a rectangular projection having an approximately square shape. As shown in FIG. 5, the stopper 14 on each lateral side has an outer side formed in the apex of the triangular end 10a' of the left or right raised portion 10a, and an inner side formed in the center raised portion 10b. The left and right stoppers 14 are aligned in an imaginary lateral center line which passes through the center of the center hole 11 and which is perpendicular to the imaginary longitudinal center line. The imaginary lateral center line appears as a line C—C in FIG. 5. The above-mentioned lateral center plane intersects the horizontal plane along the lateral center line. The center hole 11 is formed between the left and right stoppers 14. The stoppers 14 are designed to determine the closed positions of the shutters 40 by abutting against the shutters 40.

Figure 8:
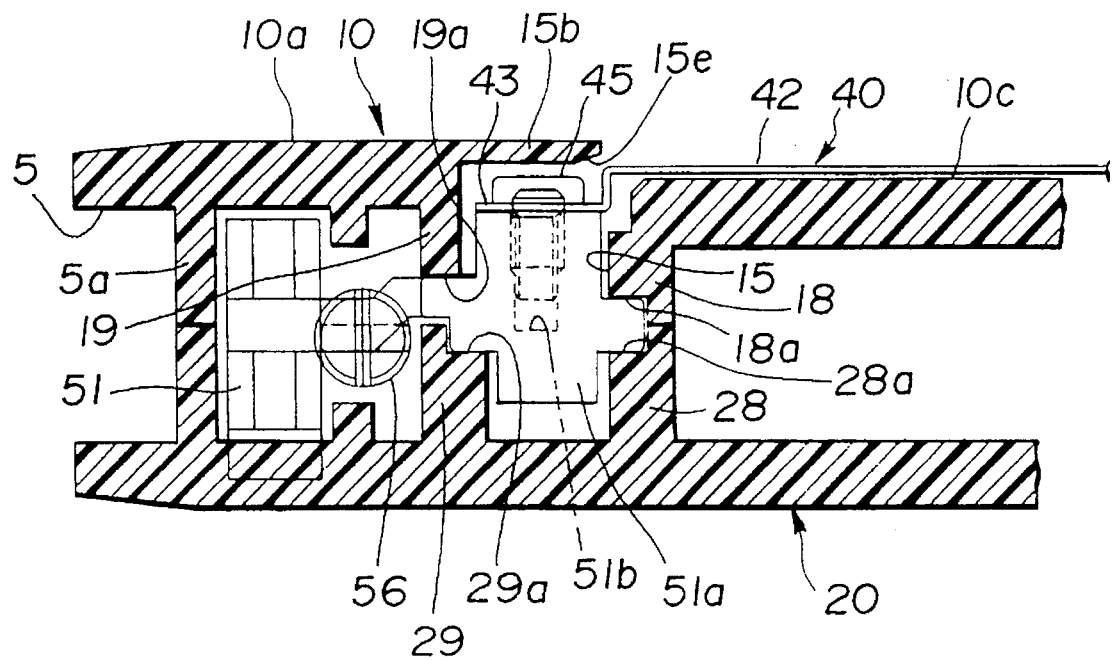
FIG. 8 is an enlarged sectional view of a portion of FIG. 6D show by a one dot line circle G.
Figure 11:
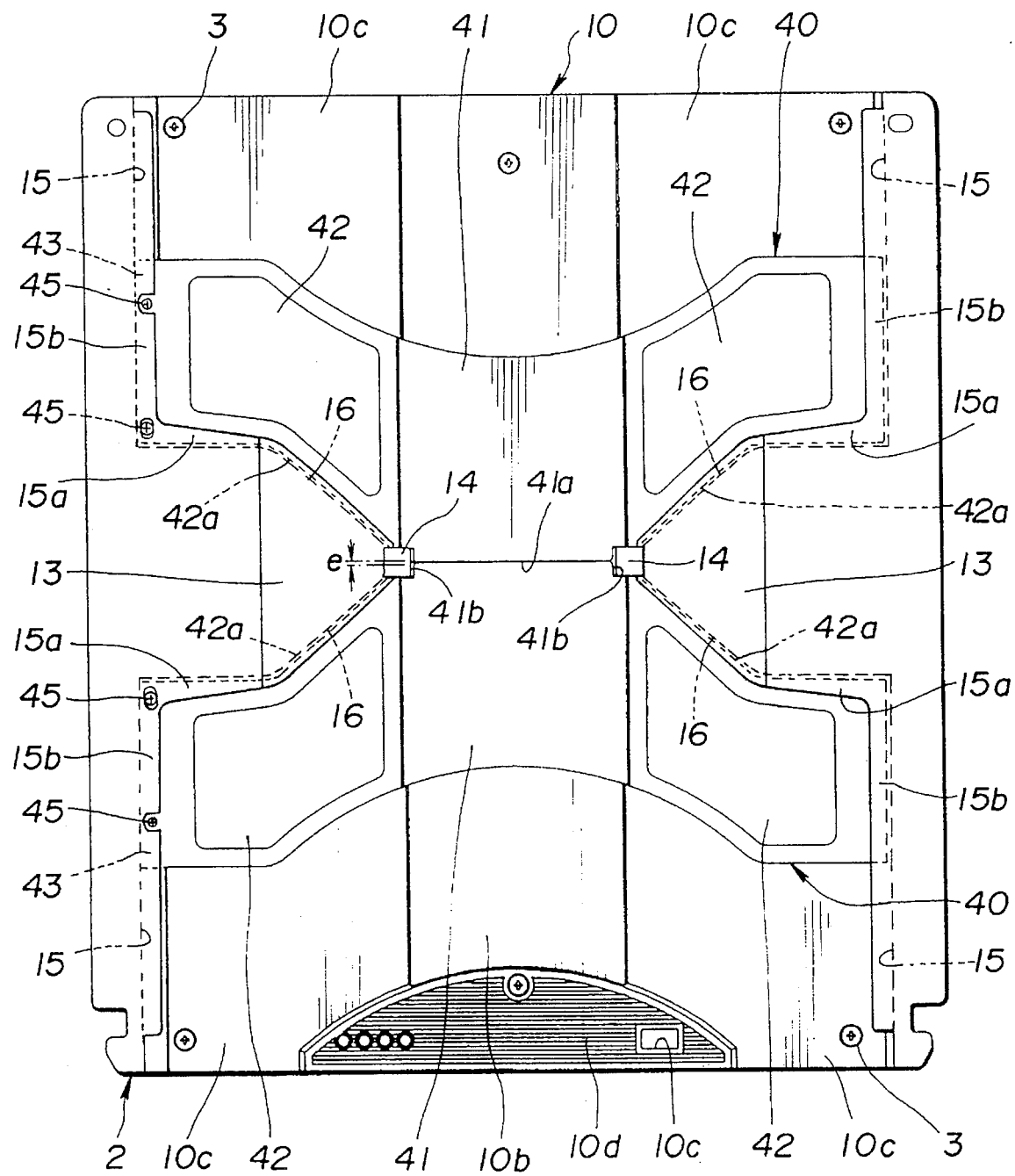
FIG. 11 is a bottom view of the disk cartridge of FIG. 1 with the shutters in the closed positions.

A guide groove consisting of an outer groove section 15 and an inner groove section 16 is formed along a boundary of each of the four depressed portions 10c as best shown in FIG. 11. The outer groove section 15 of each guide groove extends like an erected or inverted letter L or like an erected or inverted mirror image of a letter L, as shown in FIG. 11, and consists of a longitudinally extending long straight section covered by an longitudinally extending overhang 15b, and a laterally extending short straight section covered by a lateral overhang 15a. The inner groove section 16 is slant, and extends along one slant side of the triangular end 10a' and reaches one of the stoppers 14. The longitudinally extending overhang 15b projects laterally and horizontally from one of the raised portions 10a toward the center raised portion 10b, and covers the guide groove 15, leaving a slit through which a tip 43 or 44 of one of the shutters 40 extends into the groove 15, as best shown in FIG. 8. The overhang 15b is slightly higher than the upper surface of the depressed portion 10c, as shown in FIG. 8. Similarly, the laterally extending overhang 15a projects horizontally and longitudinally toward the front or rear sides of the lower half shell 10 over the lateral groove section. The slant groove section 16 is a rectangular groove shaped like a letter C, and bounded by the overhanging edge of the assist plate 13 on the upper side, the upwardly facing surface of the depressed portion 10c on the lower side, and the triangular end portion 10a'. The slant groove section 16 and the lateral groove section under the lateral overhang 15a on each corner constitute a shutter retaining groove opening longitudinally toward the front or rear end of the case, and receiving the corresponding edge of the shutters 40 in the closed state. The longitudinal extending groove section under the longitudinal overhangs 15b one each corner serves as a slide guide groove.

Each of the longitudinally extending overhangs 15b on the left side as viewed in FIG. 9 is formed with an elongate hole 15c and a U-shaped cut 15d, as shown in FIGS. 4 and 9–12. Each elongate hole 15c is located at the corner at which the longitudinal overhang 15b and the lateral overhang 15a meet. Each U-shaped cut 15d is located between the position of the elongate hole 15c and the middle of the longitudinal dimension of the longitudinal overhang 15b, near the middle of the overhang 15b. Through the elongate holes 15c and the U-shaped cuts 15d, the shutters 40 can be fastened with racks 51 and 52 by screw fasteners 45 even after the assemblage of the case 2, as shown in FIG. 10.

Figure 14:
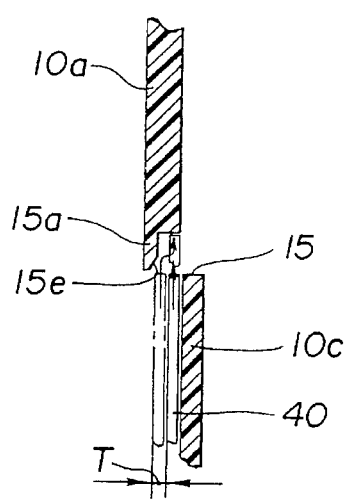
FIG. 14 is a sectional view taken across a line H—H in FIG. 13.

As shown in FIG. 8 and 14, each of the lateral and longitudinal overhangs 15a and 15b has a tapered surface 15e for facilitating the entry of one of the shutters 40 into the corresponding guide groove section. Similarly, each of the triangular plates 13 is formed with tapered surfaces 16e for facilitating the entry of one of the shutters 40 into the corresponding slant groove section 16.

Figure 7:
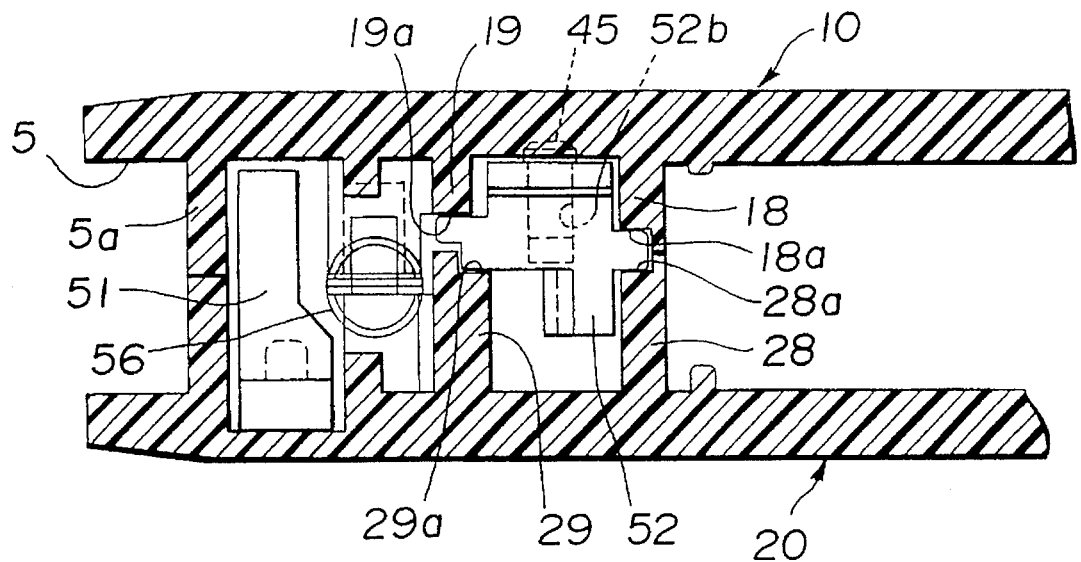
FIG. 7 is an enlarged sectional view of a portion of FIG. 6C show by a one dot line circle F.

The case 2 of the disk cartridge 1 further has left and right locating holes 4 for determining the position of the case 2 in the recording and reproducing apparatus, and left and right guide grooves 5 for guiding into recording and reproducing apparatus. The left and right locating holes 4 are open, respectively, in the left and right raised portions in the outside surface of the lower half shell 10, near the front end of the lower half shell 10. The guide groove 5 on each side is bounded vertically by the left or right edge of the lower half shell 10 on the lower side, and the left or right edge of the upper half shell 20 on the upper side. The bottom of the guide groove 5 on each side is formed by a rib (or a long narrow ridge) 5a of the lower half shell 10 and a similar rib 5a of the upper half shell 20, as shown in FIGS. 7 and 8. These ribs 5a are straight, and extend longitudinally. The disk cartridge 1 is located in the recording and reproducing apparatus (a cartridge holder, for example) with the locating holes 4 along X, Y and Z directions.

A finely corrugated segment 10d for facilitating holding of the disk cartridge is formed in the rear part of the outer surface of the lower half shell 10, as shown in FIG. 9. A rectangular hole 10e for protection is formed in the corrugated segment 10d near the right end of the corrugated segment 10d, as viewed in FIG. 9. A left and right pair of pullout rectangular notches 6 are formed in the left and right sides of the lower half shell 10 near the rear end.

In the inside of the lower shell 10, there are integrally formed a circular projecting rib 17 for receiving the magneto optical disk 30 rotatably, a left and right pair of longitudinally extending inner projecting ribs 18 and a left and right pair of longitudinally extending outer projecting ribs 19, as shown in FIG. 5. The circular rib 17 is located between the left and right inner longitudinal ribs 18, which are in turn located between the outer ribs 19. The inner and outer longitudinal ribs 18 and 19 are parallel to each other and to the longitudinal center plane of the case 2. The lower half shell 10 is further formed, as shown in FIGS. 4 and 10, with a plurality of circular fastener holes 10f for the above-mentioned screw fasteners 3 for fastening the lower and upper shells 10 and 20 together.

Figure 1:
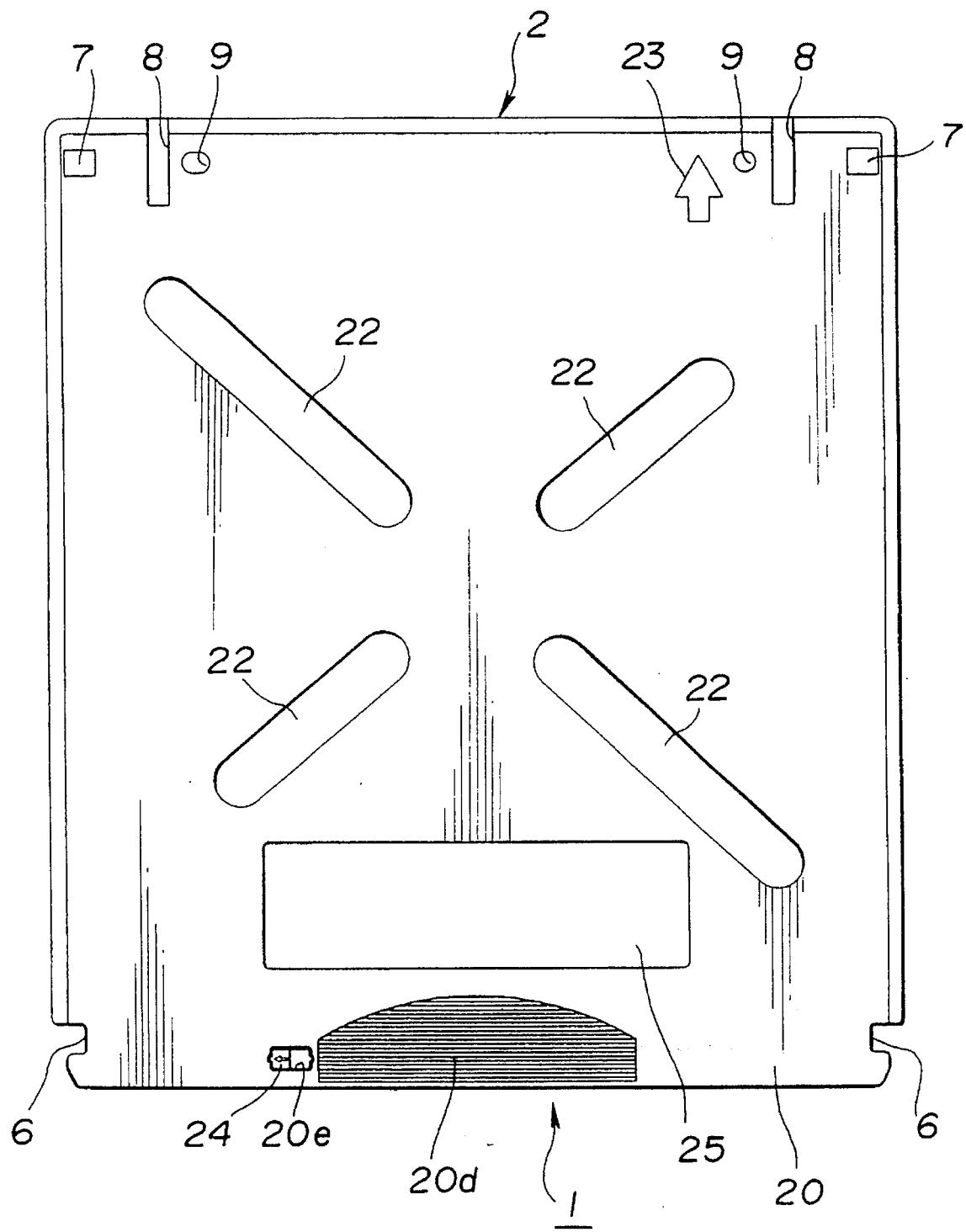
FIG. 1 is a plan view of a disk cartridge according to a first embodiment of the present invention.
Figure 2:
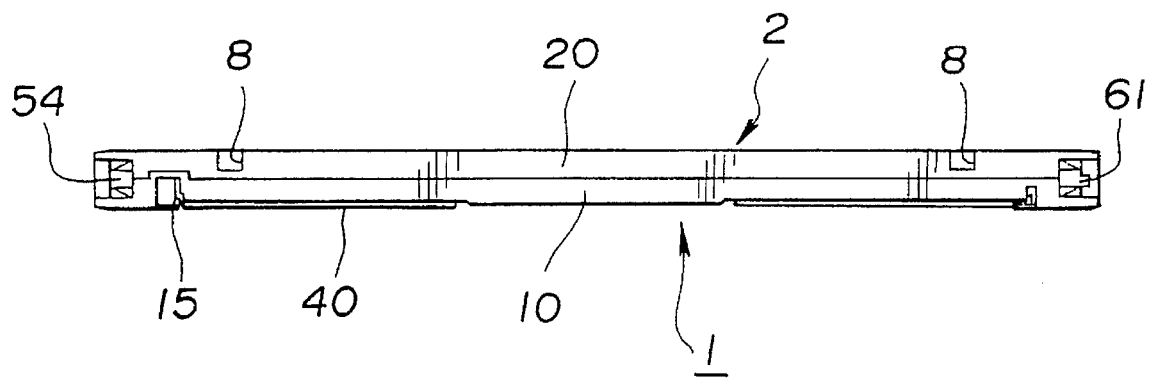
FIG. 2 is a front view of the disk cartridge shown in FIG. 1.
Figure 3:
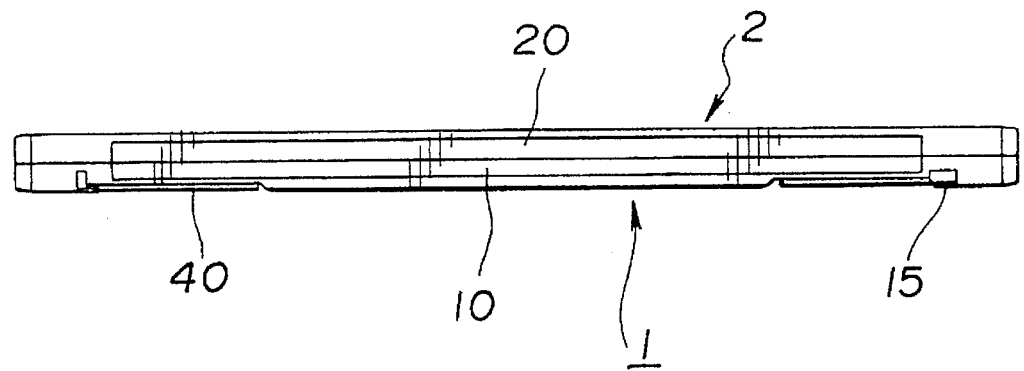
FIG. 3 is a rear view of the disk cartridge of FIG. 1.

The upper half shell 20 is formed with four grooves 22 for external magnetic field for recording and erasing, as shown in FIG. 1. The four grooves 22 are located at positions confronting the four pickup holes 12 of the lower half shell 10. In the example shown in FIG. 1, two of the grooves 22 are longer, and the longer grooves 22 are aligned in one of two oblique lines. The two shorter grooves 22 are arranged in the other oblique line. Each groove 22 is depressed in the outside surface of the upper shell 20, and raised in the inside surface of the upper shell 20, as shown in FIG. 4. The bottom of each groove 22 is thinner in wall thickness than the remainder of the upper shell 20. For example, the thickness of the upper shell is 2.5 mm whereas the thickness of the bottom of each groove 22 is 1.0 mm.

As shown in FIG. 1, in the left and right front corners of the outside surface of the upper shell 20, there are formed a left and right pair of chucking roller receiving recesses 7 for chucking the disk cartridge 2 in the recording and reproducing apparatus, and a left and right pair of grooves 8 for preventing the disk cartridge 1 from being inserted upside down into the recording and reproducing apparatus. When the disk cartridge 1 is inserted correctly with the upside up, then a left and right pair of projections of the recording and reproducing apparatus slide into the grooves 8 of the disk cartridge 1 and thereby admit the disk cartridge 1. If the cartridge 1 is inverted upside down, the projections of the recording and reproducing apparatus abut against the front end of the disk cartridge 1 and reject the disk cartridge 1.

In the outside surface of the upper shell 20, as shown in FIG. 1, there are further formed with left and right holes 9 for locating an external magnetic field (a magnet capable of inversion) along the X and Y directions. These locating holes 9 position four magnetic heads set in proximity to the radially arranged magnetic field grooves 22 of the upper shell 20.

A depressed mark 23 of an arrow indicating an inserting direction is formed in the outside surface of the upper shell 20 near the front end, and a corrugated segment 20d is formed in the rear of the outside surface of the upper shell 20. With the corrugated segments 10d and 20d of the lower and upper shells 10 and 20, the case 2 can be readily pinched. The left and right edges of the upper shell 20 define the left and right guide grooves 5, respectively. At the side of the corrugated segment 20d, there is formed a rectangular hole 20e receiving a record protector 24. A rectangular depression 25 for label attachment is between the corrugated segment 20d and the grooves 22 in the outside surface of the upper shell 20. The left and right pair of pullout rectangular notches 6 are formed in the left and right sides of the lower and upper half shells 10 and 20 near the rear end of the case 2. The recording protector 24 is a switch lever which can be switched left and right to allow or inhibit recording in cooperation with a sensor in the recording and reproducing apparatus.

As shown in FIG. 4, the upper half shell 20 is formed integrally with a front and rear pair of projecting upright walls 26 for preventing extraction. In this example, the walls 26 are located on a second lateral side of the longitudinal center (median) plane of the case 2, that is, on the right side as viewed in FIG. 4. The front and rear walls 26 extend longitudinally like two separate line segments of a single straight line along which the longitudinally extending groove sections 15 of the lower half 10 extend. In the inside of the upper half shell 20, there are formed integrally a circular projecting rib 27 for receiving the magneto optical disk 30 rotatably, a left and right pair of inner straight projecting ribs 28 and a left and right pair of outer straight projecting ribs 29. The upper half shell 20 is further formed integrally with a plurality of cylindrical projecting bosses 20f into which the screw fasteners 3 are screwed through the fastener holes 10f of the lower half shell 10.

The front and rear shutters 40 of this example are substantially symmetrical with respect to the lateral center plane which is perpendicular to the longitudinal center (median) plane and contains the axis of the circular center hole 11. The front shutter 40 closes the two pickup holes 12 on the front side and the front half of the center hole 11 of the lower half shell 10, as shown in FIG. 11, whereas the rear shutter 40 closes the rear two pickup holes 12 and the rear half of the center hole 11.

Each shutter 40 has a center slide portion 41 slidably mounted on the center raised portion 10b of the lower half shell 10, and first and second wings 42 extending, respectively, from both sides of the center portion 41 in the two opposite, left and right, directions over the left and right depressed portions 10c on the front or rear side. The first wing has the tip which is depressed and slidably received in the first lateral side groove 15 as best shown in FIG. 8. As viewed in FIG. 5, the first lateral side is the left side, and the second lateral side is the right side. The wing tip 43 is not a pointed tip, but extends in parallel to the longitudinal center line. The depressed wing tip 43 of this example is substantially flat and parallel to the horizontal overhang 15b, and located under the overhang 15b of the groove 15, as shown in FIG. 8. Similarly, the second wing 42 has a wing tip 44 slidably received in the second lateral side groove 15 under the overhang 15b. For example, the shutters 40 are made by bending a sheet of metal by press forming.

The center portion 41 of each shutter 40 has a straight inward edge 41a extending along the lateral center plane from a first lateral side rectangular indentation 41b to a second lateral side rectangular indentation 41b, as shown in FIGS. 4 and 10. When the front and rear shutters 40 are in their closed positions as shown in FIG. 11, the rectangular stopper projections 14 of the lower half shell 10 on the left and right sides are fit in the left and right side rectangular indentations 41b of the front and rear shutters 40, and the inner straight edges 41a of the center portions 41 of the front and rear shutters 40 are almost in contact with each other along the lateral center plane passing through the center of the center hole 11.

Figure 12:
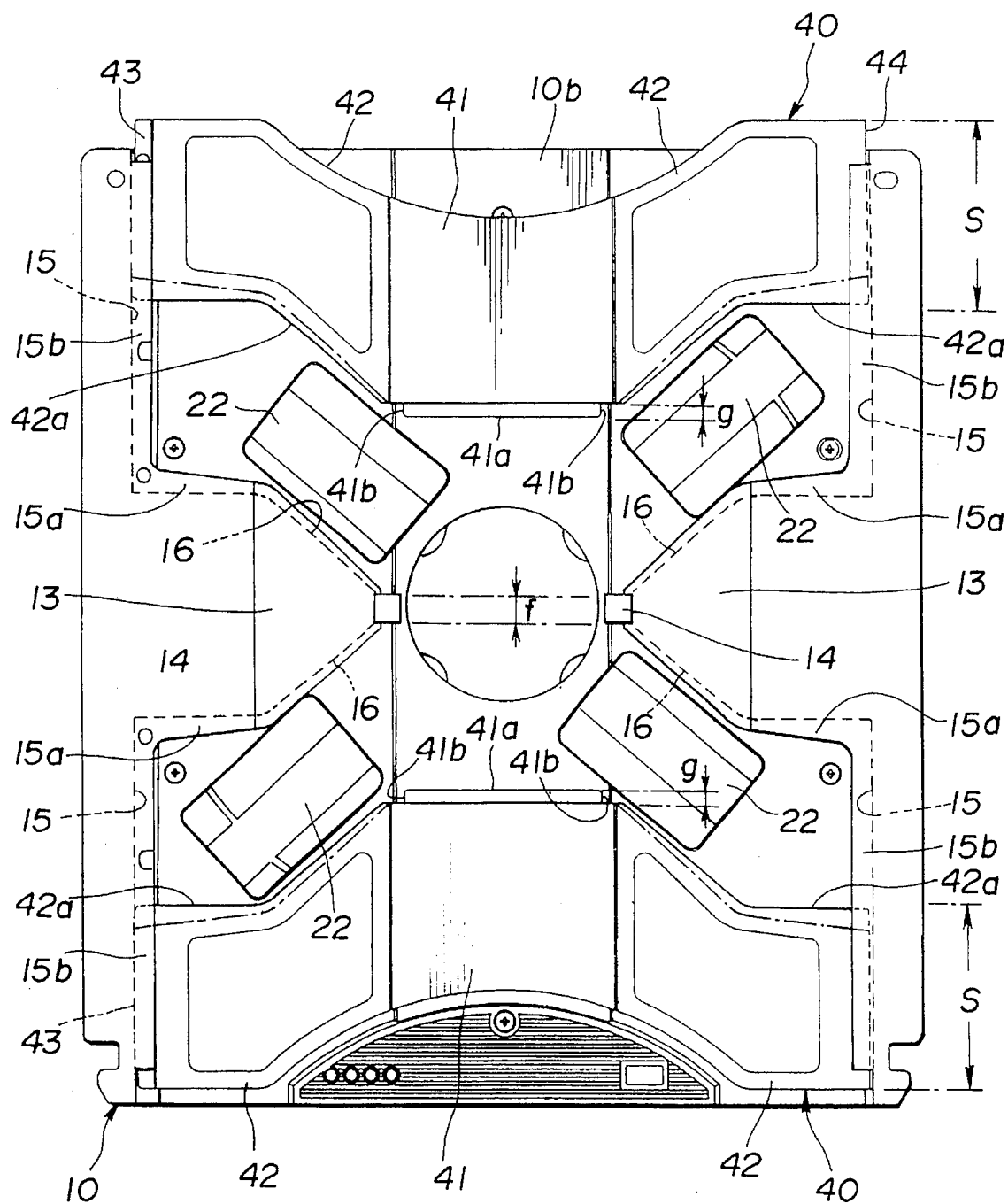
FIG. 12 is a bottom view of the disk cartridge of FIG. 1 with the shutters in the open positions.

A narrow spacing e between the inward edges of the front and rear shutters 40 in the closed state as shown in FIG. 11 is determined by the dimensions of the rectangular indentations 41b and the shutter stopper projections 14. As shown in FIG. 12, g is the dimension of the rectangular indentations 41b of the shutters 40 along the longitudinal, front and rear direction of the case 2, and f is the dimension of the rectangular stopper projections 14 of the lower half shell 10 along the longitudinal direction. The spacing e between the closed shutters 40 is given by: e=f–2g. The spacing e is made greater than zero, that is, e=f–2g>0, to prevent collision between the shutters 40. Simultaneously, the spacing e is designed as small as possible, inclusive of tolerance.

Figure 13:
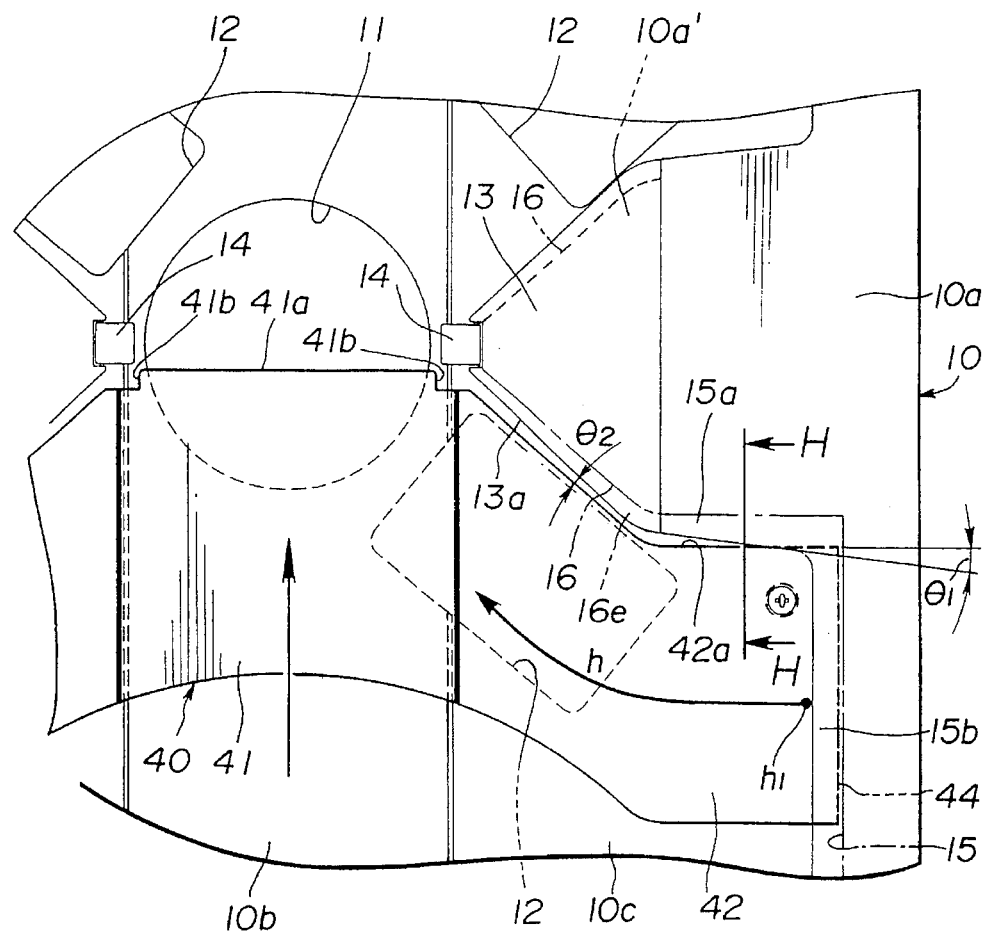
FIG. 13 is an enlarged view showing a central portion of the lower side of the disk cartridge of FIG. 1.

Each wing 42 of the shutters 40 has an inward edge 42a extending like a doglegged line and consisting of a slant section and a laterally extending section. The inward edge 42a of each wing 42 comes into the lateral groove section under the lateral overhang 15a and the slant groove section 16 to the depth shown by a one dot chain line in FIG. 12. The inward edge 42a of each wing 42 is designed so that one end of the inward edge 42a enters the guide groove first, and the other end of the inward edge 42a enters last. As shown in FIG. 13, the lateral section of the inner edge 42a and the outer edge of the lateral overhang 15a form an angle θ1. The slant section of the inward edge 42a forms an angle θ2 with an outer edge 13a of the plate 13. The outboard end of the inward edge 42a enters the guide groove first, and the inserted portion of the inward edge 42a expands along a direction h from an outboard end point h1 shown in FIG. 13. At the outboard point h1, the wing 42 is exempt from deflection, and has no difficulty in entering the guide groove. This design allows the inward edge 42a of each wing 42 to enter the corresponding guide groove smoothly without interfering with the overhangs 15a and the outer edge 13a of the triangle plate 13. The tapered or chamfered ends 15e and 16e shown in FIGS. 10, 13 and 14 further facilitate the entry of the shutters 40 into the guide grooves. The second lateral side wing tip 44 of each of the front and rear shutters 40 is bent at right angles to the wing, and engaged with a corresponding one of the upright walls 26 of the upper half shell 20.

A shutter opening mechanism 50 for opening and closing the shutters 40 includes at least a driver (or driving side) slide rack 51 connected with one of the shutters 40, a follower (or driven side) slide rack 52 connected with the other shutter 40, and a pinion 53 which is rotatably mounted on the case 2, and engaged between the first and second racks 51 and 52. The shutter opening mechanism 50 in this example is disposed on the first lateral side of the longitudinal center plane, that is, on the left side as viewed in FIG. 5. In this example, the shutter opening mechanism 50 serves as a main component of the driving or operating means for moving the shutters 40.

The driver rack 51 of this example is longer than the follower rack 52, as shown in FIGS. 4 and 5. The driver rack 51 is received in an outer guide channel formed behind an outer upright wall formed by the ribs 5a of the lower and upper half shells 10 and 20 defining the bottom of the first lateral side guide groove 5, as shown in FIGS. 7 and 8. In this outer grade channel, the driver rack 51 is slidable longitudinally in parallel to the longitudinal center line.

The follower rack 52 is received in an inner guide channel formed between an inner upright wall formed by the ribs 18 and 28 of the lower and upper half shells 10 and 20, and an intermediate upright wall formed by the ribs 19 and 29 of the lower and upper half shells 10 and 20, as shown in FIG. 7. The follower rack 52 has an inner projecting portion slidably received in a groove formed between end surfaces 18a and 28a in the inner wall of the ribs 18 and 28, and an outer projecting portion slidably received in a slot formed in the intermediate wall of the ribs 19 and 29 between end surfaces 19a and 29a, as shown in FIG. 7.

Figure 17:
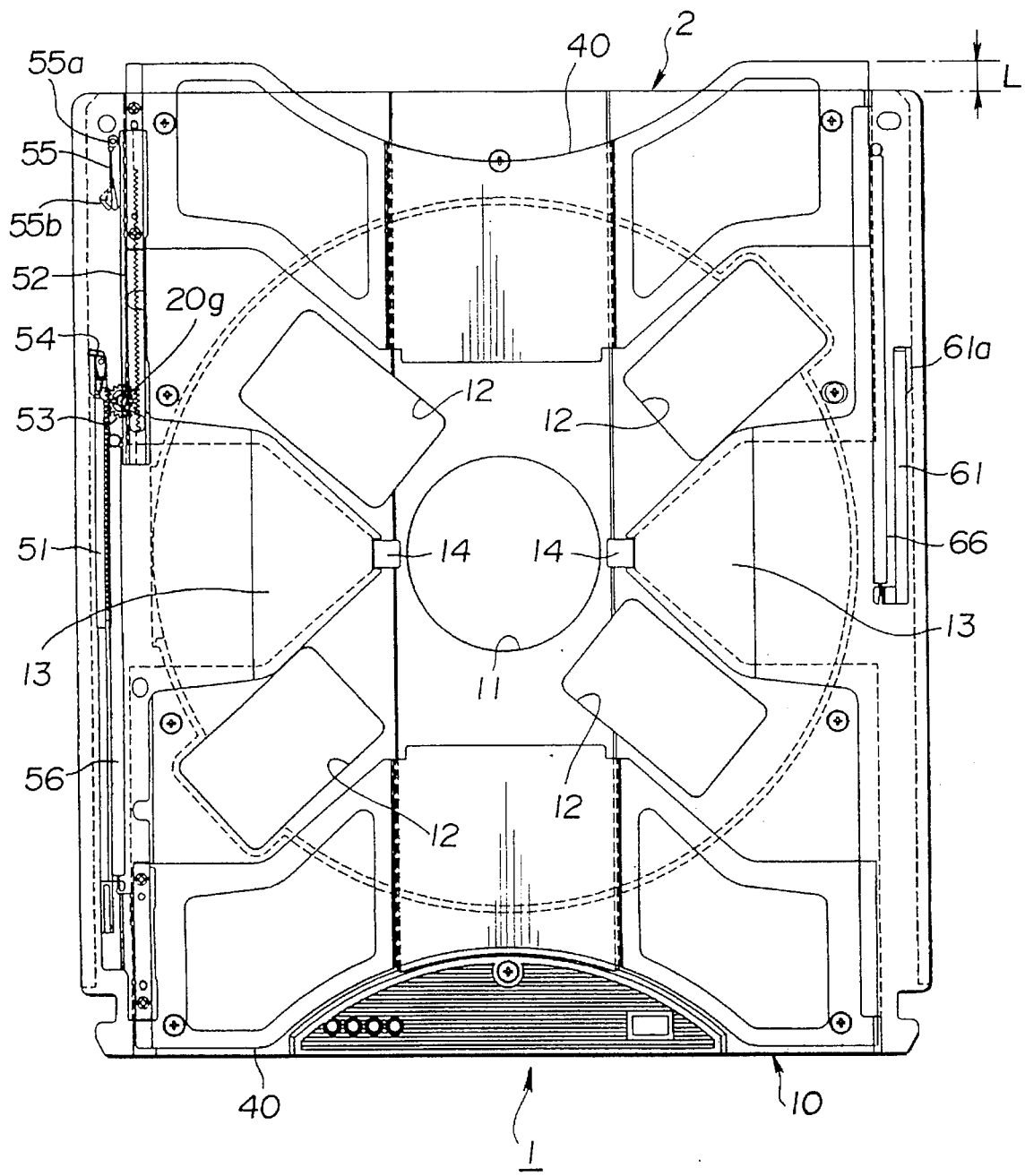
FIG. 17 is a bottom view of the disk cartridge of FIG. 1 with the shutters in the open positions, in the recording and reproducing apparatus.

The pinion 53 is rotatably mounted on a shaft portion 20g projecting from the inside of the upper half shell 20, as shown in FIGS. 4 and 17. Therefore, the pinion 53 of this example is rotatable on an axis extending in a vertical direction perpendicular to the disk 30. The pinion 53 is engaged with the driver rack 51 on the outer side and with the follower rack 52 on the inner side. Rotation of the pinion 53 causes the driver and follower racks 51 and 52 to move in the opposite directions along the longitudinal center line of the case 2. In this example, the pinion 53 is located in a front half of the case 2, about the middle between the lateral center plane and the front end of the case 2.

The driver rack 51 has a rear portion 51a as shown in FIG. 4. The rear portion 51a of the driver rack 51 is fastened with the wing tip 43 of the first lateral side wing 42 of the rear shutter 40 by screw fasteners 45 screwed into front and rear threaded screw holes 51b of the rear portion 51a of the driver rack 51 through front and rear fastener holes 43a of the rear shutter 40, as shown in FIGS. 4 and 5. The rear portion 51a of the driver rack 51 is slidably received in the inner guide channel between the inner wall formed by the ribs 18 and 28, and the intermediate wall formed by the ribs 19 and 29, as shown in FIG. 8. The driver rack 51 has a long main portion received in the outer guide channel and the rear portion 51a which extends laterally from the rear portion of the long main portion of the driver rack 51 through the slit of the intermediate wall between the wall surfaces 19a and 29a, as shown in FIG. 8, into the inner guide channel. The rear portion 51a has an outer projection slidably received in the groove between the wall end surfaces 18a and 28a in the inner wall, like the follower rack 52, and an inner portion slidably received in the slot between the wall end surfaces 19a and 29a.

A front portion 52a of the follower rack 52 is fastened with the wing tip 43 of the first lateral side wing 42 of the front shutter 40 by screw fasteners 45 screwed into front and rear threaded screw holes 52b of the rear portion 52a of the driver rack 51 through front and rear fastener holes of 43a of the front shutter 40, as shown in FIGS. 4, 5 and 7. The follower rack 52 is slidable in the inner channel in front of the rear portion 51a of the driver rack 51.

Figure 19A:
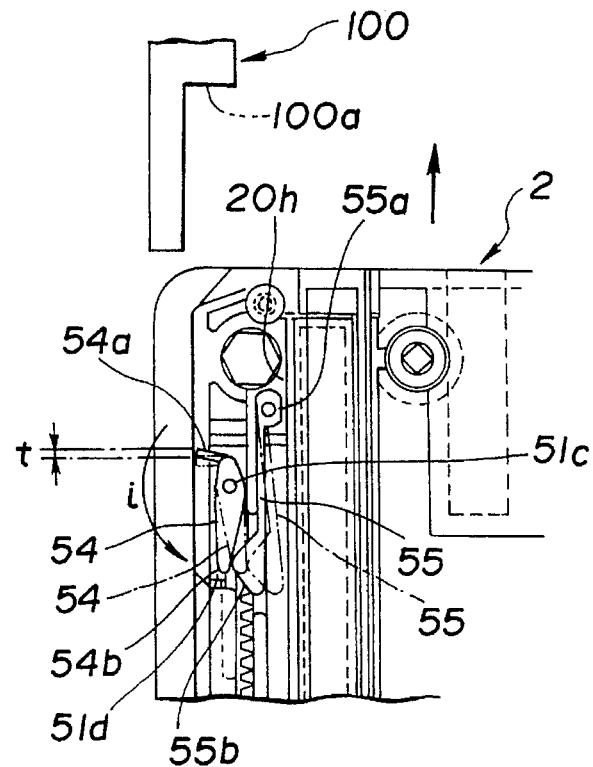
FIG. 19A is an enlarged bottom view showing one front corner of the disk cartridge of FIG. 1 slightly inserted in the recording and reproducing apparatus.
Figure 19B:
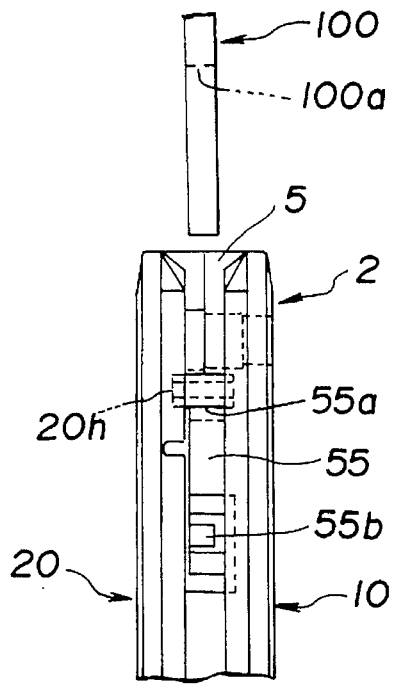
FIG. 19B is an enlarged side view of the disk cartridge shown in FIG. 19A.
Figure 19C:
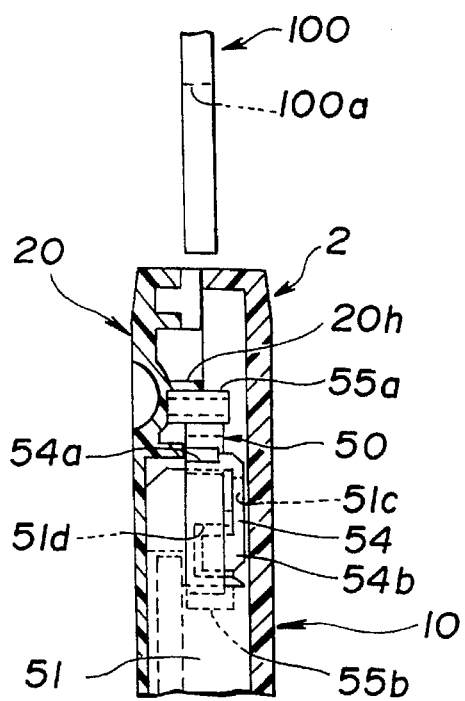
FIG. 19C is an enlarged sectional view showing the disk cartridge of FIG. 19A.

As shown in FIGS. 4 and 19, the shutter opening mechanism 50 further includes a release lever 54 swingably mounted on the driver rack 51, a lock lever (or spring lock) 55 mounted on the case 2, for locking the driver rack 51, and a tension coil spring 56 for pulling the driver rack 51 forward toward a foremost position close the shutters 40.

The release lever 54 has a base portion swingably mounted on a pin 51c formed integrally in a front portion of the driver rack 51, and a swingable first arm 54b which projects from the base portion, and which can be received in a notch 51d formed in the front portion of the driver rack 51. In this example, the pin 51c projects integrally from the driver rack 51c along the vertical direction, that is, in parallel to the axis of the disk 30. The release lever 54 has a second arm 54a somewhat like a bell crank. The second arm 54a projects from the base portion into the guide groove 5 on the first lateral side of the case 2 through a cut portion 5b of the rib 5a defining the vertical bottom of the guide groove 5. The release lever 54 serves as a pushing means for receiving a pushing force and for pushing the driver rack 51 rearward, and the second arm 54a serves as an outer arm of the pushing means projecting in the groove 5 on the first lateral side through the cut portion or slit 5b.

Figure 15:
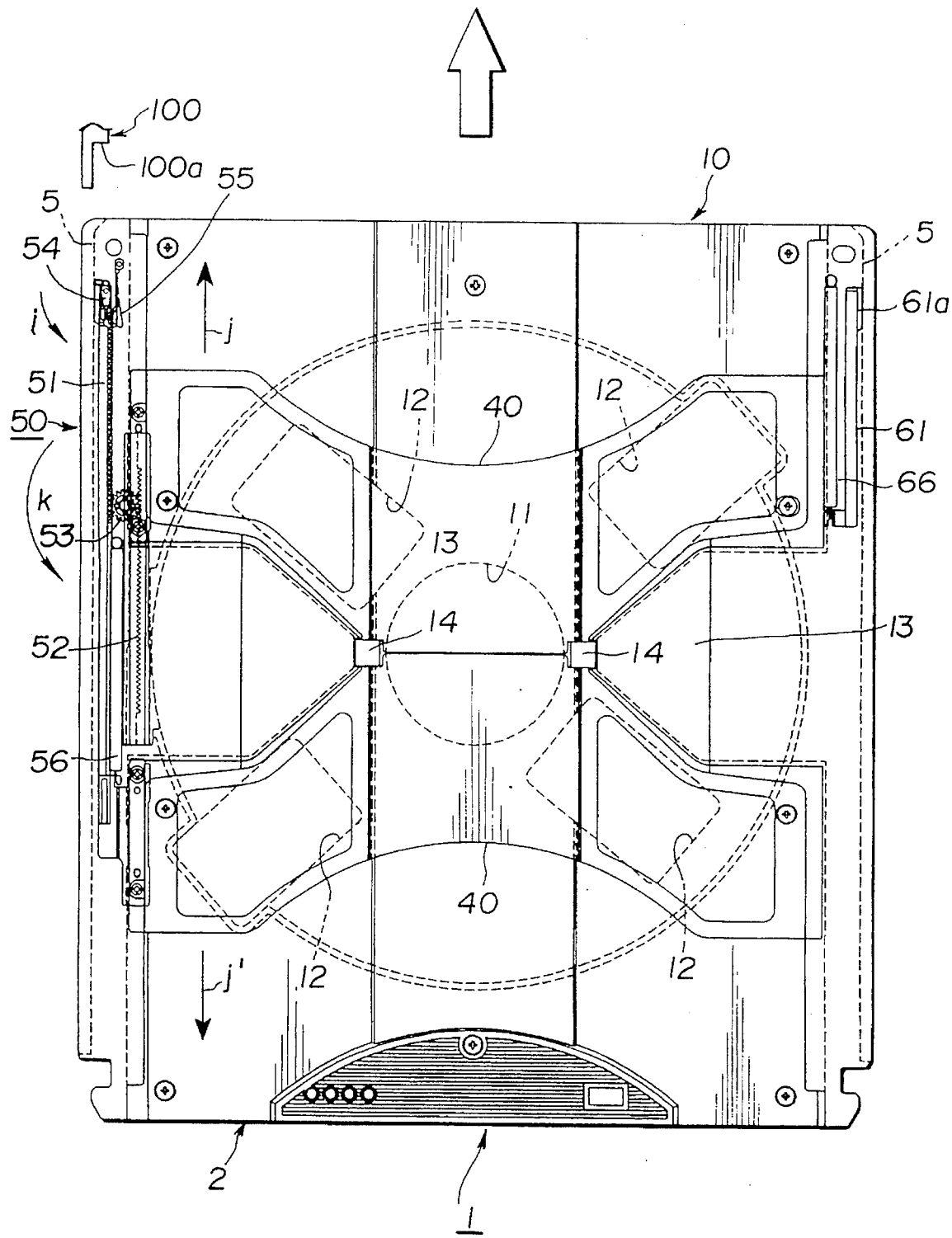
FIG. 15 is a bottom view of the disk cartridge of FIG. 1 slightly inserted in a recording and reproducing apparatus.
Figure 16:
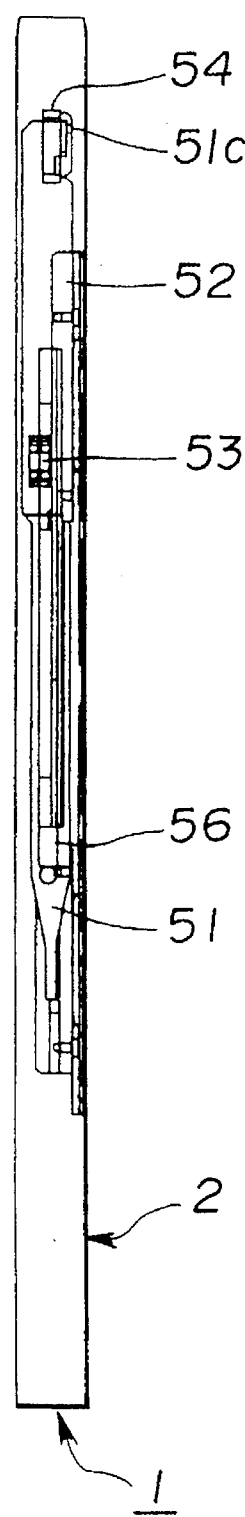
FIG. 16 is a side view of the disk cartridge of FIG. 15.

The lock lever (spring lock) 55 has a base portion 55a fit in a recess 20h formed in the inside of the upper half shell 20, and a forward end 55b having a claw-like projection which can be engaged in the notch 51d of the driver rack 51. The lock lever 55 can be deformed elastically in such a direction that the forward end 55b moves away from the notch 51d. When the release lever 54 is pushed by an abutment surface 100a of a shutter opener 100 of the recording and reproducing apparatus as shown in FIGS. 15 and 19, and forcibly rotated in a counterclockwise release direction, then the forward end 54b of the release lever 54 pushes the forward end 55b of the lock lever 55, and deforms the lock lever 55 elastically, so that the forward end 55b of the lock lever 55 is disengaged from the notch 51d.

The coil spring 56 has a front spring end held by a pin projecting from the inside of the lower half shell 10, and a rear spring end held by the rear portion 51a of the driver rack 51. The coil spring 56 extends longitudinally between the driver and follower racks 51 and 52.

A dummy slider 61 is slidably received, as shown in FIG. 5, in a second lateral side outer channel between the ribs 5a and the outer ribs 19 and 29. The dummy slider 61 has a head portion 61a which is exposed in the outside through a cutout portion 5b of the ribs 5a. A tension coil spring 66 is disposed to pull the dummy slider 61 forward. A first spring end of the coil spring 66 is held by a pin projecting from the inside of the lower shell 10. A second spring end is held by the rear end portion of the dummy slider 61. The dummy slider 61 and the tension coil spring 66 facilitate smooth ejection of the disk cartridge 1 from the recording and reproducing apparatus. Without the spring 66 on the second side, the coil spring 56 alone on the first lateral side would produce a moment, and tend to twist the case 2. The dummy slider 61 and the spring 66 on the second lateral side can avoid such an undesired warp of the case 2.

The disk cartridge 1 can be readily assembled in the following manner. The shutter opening mechanism 50 and the dummy slider 61 are disposed in the upper and lower half shells 20 and 10, and then the upper and lower half shells 20 and 10 are fixed together by the screw fasteners 3. Thereafter, the shutters 40 are mounted on the lower shell 10 from the directions shown in FIG. 10 by inserting the wing tips 43 and 44 into the longitudinally extending guide groove sections 15 from the front side and rear side, respectively. Then, the first lateral side wing tips 43 of the shutters 40 are fixed, respectively, to the racks 51 and 52 by the screw fasteners 45 through the elongate holes 15c and the U-shaped cuts 15d formed in the longitudinal overhangs 15b.

Because the upper half shell 20 is down in the assemblage as shown in FIGS. 4 and 10, the fit of each rack 51 or 52 along the left and right direction is determined by the accuracy of the grooves of the ribs 28 and 29 formed in the upper shell 20, as shown in FIGS. 7 and 8. In this example, a deviation or shift between the upper and lower shells 20 and 10 in the left and right direction is taken into account as a tolerance, and the grooves of the ribs 18 and 19 formed in the lower shell 10 are made wider. The vertical wall surfaces of the grooves defined by the side wall surfaces 28a and 29a of the ribs 28 and 29 of the upper half shell 20 determine the fitting of each of the rear portion 51a of the driver rack 51 and the follower rack 52 along the left and right direction. The fittings of the rear portion 51a of the driver rack 51 and the follower rack 52 along the vertical direction are determined by the horizontal wall surfaces 18a and 19a of the ribs 18 and 19 of the lower shell 10 and the horizontal surfaces 28a and 29a of the ribs 28 and 29 of the upper shell 20. The depths of the grooves defined by the wall surfaces 18a, 19a, 28a and 29a are made small in order to reduce the friction of the rear portion 51a of the driver rack 51 and the follower rack 52, reduce the contact surfaces between the grooves and the racks 51 and 52, and improve the accuracy by reducing influence of a taper for extraction.

When the thus-constructed disk cartridge 1 is inserted into the slot of the recording and reproducing apparatus, as shown in FIG. 15 and 19A, the shutter opener 100 on one lateral side of the recording and reproducing apparatus enters the guide groove 5 of the cartridge 1 on the first lateral side. With further insertion of the cartridge 1, the step surface 100a of the shutter opener 100 pushes the second arm 54a of the release lever 54 and causes the second arm 54a of the release lever 54 to swing in a counterclockwise direction i as viewed in FIG. 19A by a distance t, and accordingly, the first arm 54b of the release lever 54 pushes the forward end 55b of the lock lever 55. By this pushing force from the release lever 54, the lock lever 55 deforms elastically and the forward end 55b of the lock lever 55 moves away from the notch 51d of the driver rack 51, so that the driver rack 51 is unlocked. At the same time, the driver rack 51 slides in the rearward direction j' as shown in FIG. 15. With this sliding movement of the rack 51, the pinion 53 rotates in the counterclockwise direction k shown in FIG. 15, and causes the follower rack 52 to slide in the forward direction j shown in FIG. 15. As the racks 51 and 52 slides in the opposite directions, the front and rear shutters 40 move away from each other to open the center hole 11 and the four pickup holes 12 as shown in FIG. 17. An amount of stroke S of each shutter 40 as shown in FIG. 12 is equal to that of the other shutter 40. In this case, the second lateral side wing tip 44 of each shutter 40 is always guided by the overhang 15b of the lower half shell 10, and engaged with the wall 26 of the upper shell 20, so that the shutters 40 cannot slip out of the guide grooves 15 of the lower half shell 10.

Figure 18:
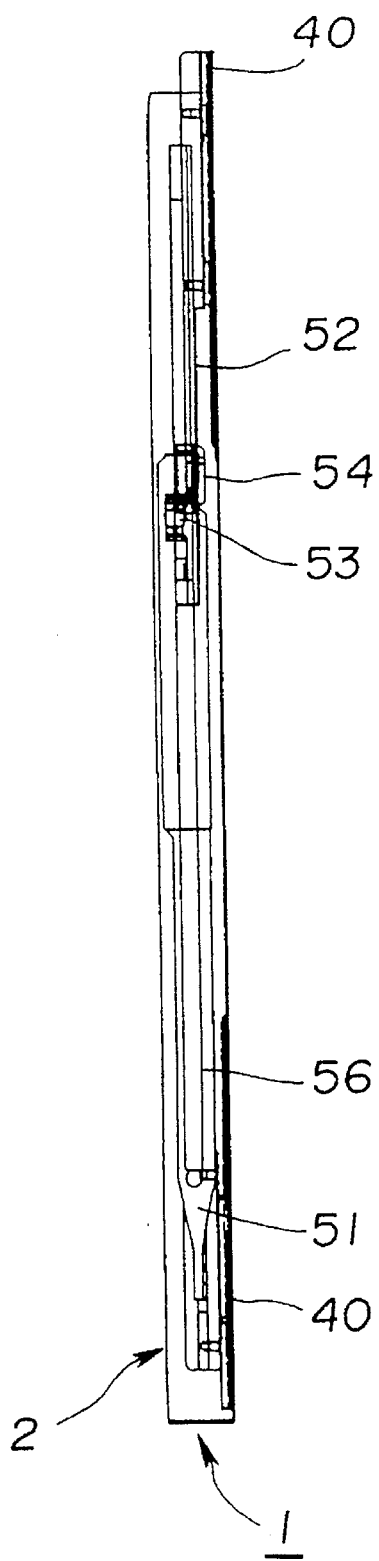
FIG. 18 is a side view of the disk cartridge shown in FIG. 17.

FIGS. 17 and 18 show the disk cartridge 1 with the shutters 40 in the fully open state in the recording and reproducing apparatus. In the full open state, the outward end of the front shutter 40 projects from the front end of the case 2 of the cartridge 1 by a distance L shown in FIG. 17. However, this projection of the front shutter 40 is not troublesome in handling since this projection normally occurs only in the recording and reproducing apparatus. The rear shutter 40 moves only within the area of the case 2 without projecting beyond the case 2. The rear shutter 40 is therefore unobstructive and safe.

After the shutters 40 are fully opened, the disk 30 revolves in the cartridge with a hub 31 (shown in FIG. 6C) resting on the turntable driven by a spindle motor, and information is recorded or erased on the inner circumferential side of the disk 30 with a pair of optical pickups inserted in a pair of the pickup holes 12 arranged in one diagonal line in the lower shell 10, and a pair of magnetic heads set close to a pair of the field grooves 22 aligned in one diagonal line in the upper shell 20. Moreover, information can be recorded or erased on the outer circumferential side of the disk 30 with a pair of optical pickups inserted in a pair of the pickup holes 12 arranged in the other diagonal line in the lower shell 10, and a pair of magnetic heads set close to a pair of the field grooves 22 aligned in the other diagonal line in the upper shell 20. The information recorded on the inner and outer circumferential sides of the magneto optical disk 30 can be reproduced by a corresponding means such as optical pickups.

In general, the upper side (the upper shell's side) of the magneto optical disk cartridge is formed with at least one hole in which a magnetic head (magnet) is inserted for recordation and erasure. In this embodiment of the present invention, however, the upper shell 20 is formed with the grooves 22 for external magnetic field instead of the holes in consideration of the magnetic field strength of each magnetic head. The magnetic heads are set in the grooves 22. Therefore, the cartridge 1 according to the embodiment requires no shutters on the upper shell's side.

In the inserted state of the disk cartridge 1 in the recording and reproducing apparatus, the second arm 54a of the release lever 54 mounted on the front portion of the driver rack 51 is pushed rearward toward the cut portion 5b of the groove 5 against the resilient force of the tension coil spring 56 by the shutter opener 100 and the shutters 40 are in the fully open state as shown in FIGS. 17 and 18. When an eject operation is started, the driver rack 51 slides in the forward direction j opposite to the rearward direction j' shown in FIG. 15 by the resilient force of the spring 56, and the pinion 53 transmits the forward movement of the driver rack 51 to the follower rack 51 and causes the follower rack 51 to slide in the rearward direction j'. Therefore, the rear shutter 40 moves forward toward the center hole 11 together with the driver rack 51 while the front shutter 40 moves rearward toward the center hole 11 together with the follower rack 52 until the center hole 11 and the pickup holes 12 are fully closed as shown in FIGS. 5 and 15. The stroke S, as shown in FIG. 12, of the closing movement of each shutter 40 is equal to that of the other. When the disk cartridge 1 is ejected from the recording and reproducing apparatus, the second arm 54a of the release lever 54 moves away from the abutment surface 100a of the shutter opener 100, the release lever 54 rotates in the clockwise direction opposite to the counterclockwise direction i shown in FIG. 15, and the first arm 54b of the release lever 54 withdraws. On the other hand, the lock lever 55 deforms and the forward end 55b of the lock lever 55 enters the notch 51d of the driver rack 51 to lock the driver rack 51.

Since the shutters 40 are mounted on the lower side of the case 2, the shutters 40 might bend downward or sag due to their own weight or clattering slide motion of the shutters 40. Because of the design including the angles θ1 and θ2 shown in FIG. 13 and the tapered edges 15e and 16e, however, the inward edge 42a of each shutter wing 42 can enter the grooves at 15a and 16 smoothly, and the rectangular indentations 41b of the shutters 40 reliably abut against the stopper projections 14 without overrunning onto the stopper projections 14. The inward edges 42a of the shutters are sheathed in the shutter retaining grooves at 15a and 16 in the closed positions of the shutters 40. Therefore, these shutter retaining grooves protect the shutters 40 from being warped or deformed. In the closed state, the shutters 40 can keep out dust effectively with the straight inward edges 41a closely confronting each other with a minimum gap.

The drive mechanism of the racks 51 and 52 and the pinion 53 is smooth and reliable in movement, compact in size, simple in construction and small in the number of required component parts. The center holes 11 and the pickup holes 12 are closed by the two of the shutters 40, so that the area of the cartridge can be reduced. The upper half shell 20 of the illustrated example is formed with the magnetic field grooves 22 having bottoms of a thin wall thickness for the external magnetic field, instead of being formed with through holes. These grooves 22 make it possible to bring the magnetic head closer to the recording surface of the magneto optical disk 30, and moreover increase the rigidity of the case 2.

The guide grooves 15 and the overhangs 15a and 15b are formed integrally in the lower half shell 10, so that the number of required component parts can be reduced. The holes 15c and the cutout 15d enable an operation of joining the shutters 40 to the racks 51 and 52 after the lower and upper shells 10 and 20 have been assembled into the case 2. The center raised portion 10b of the lower shell 10 guides the shutters 40 by fitting in the recessed center portions 41 of the shutters 40. Thus, each shutter 40 is guided at the middle and the left and right ends. This design makes the sliding movement of the shutters smooth, and facilitates a centering adjustment of the shutters 40.

In this example, the front and rear shutters 40 are arranged substantially symmetrically, so that the strokes S of the shutters 40 are equal to each other. The shutter stoppers 14 make it possible to minimize the gap between the inward edges 41a of the shutters 40.

Figure 20:
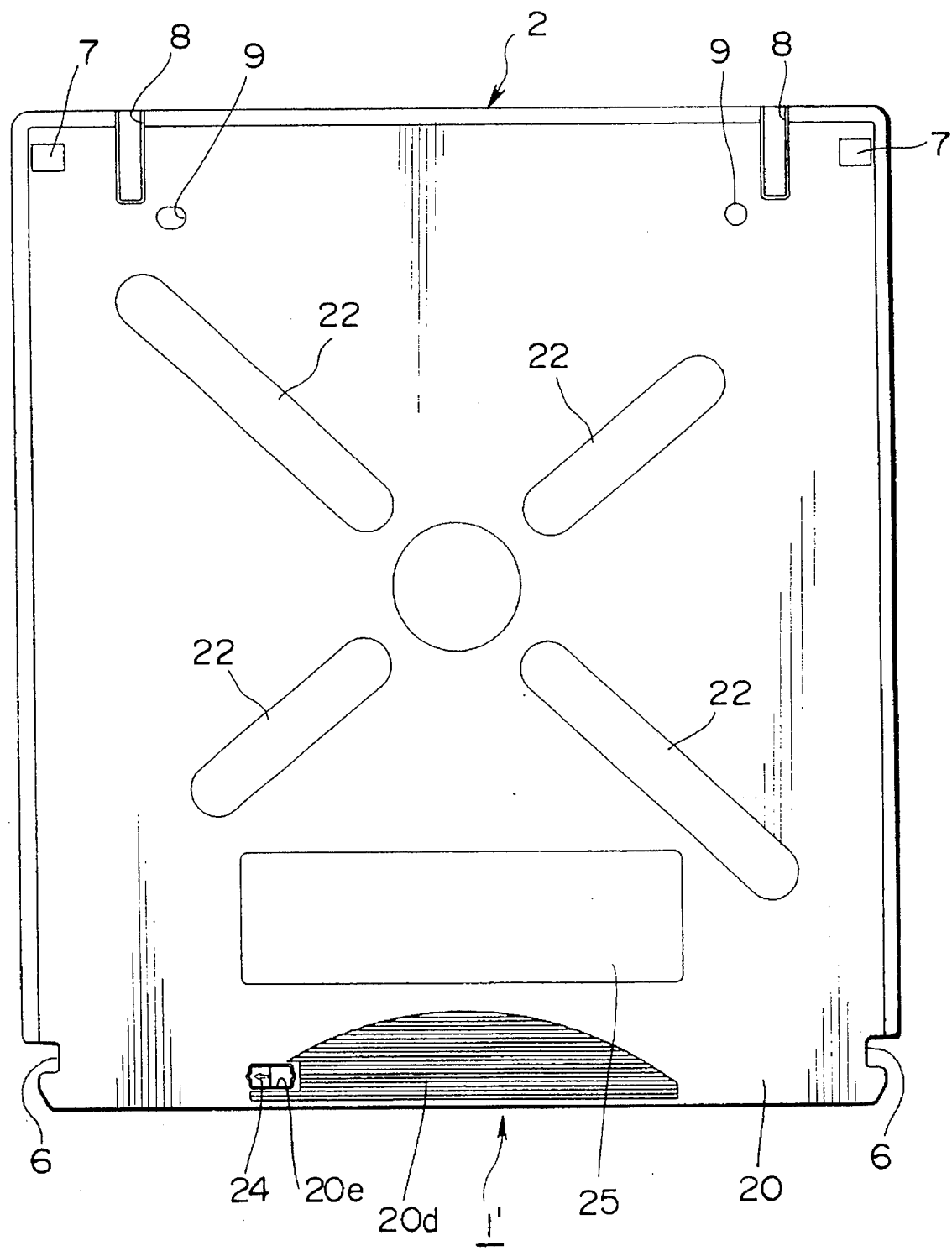
FIG. 20 is a plan view of a disk cartridge according to a second embodiment of the present invention.
Figure 21:
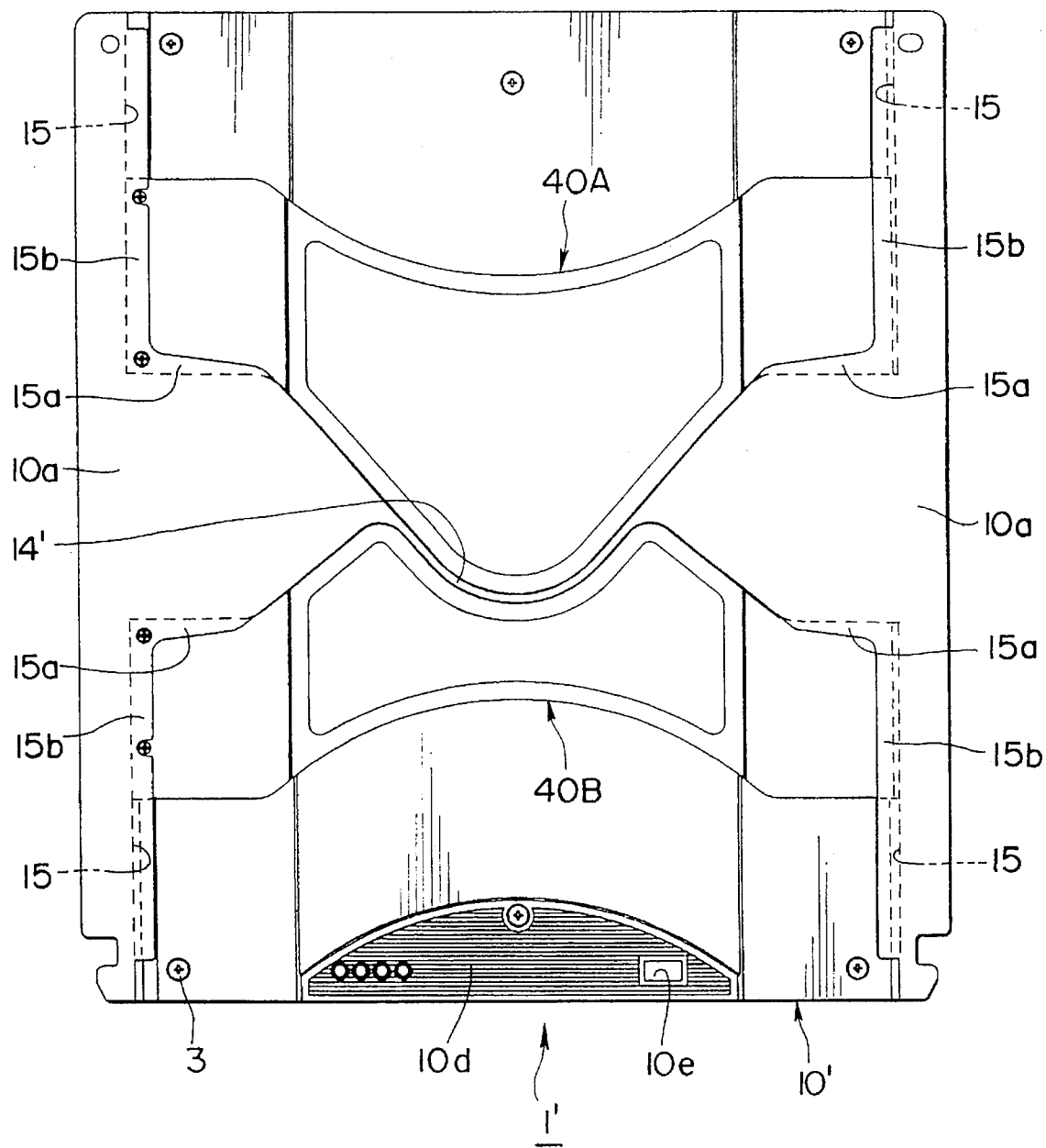
FIG. 21 is a bottom view of the disk cartridge shown in FIG. 20 with a pair of shutters in the closed positions.
Figure 22:
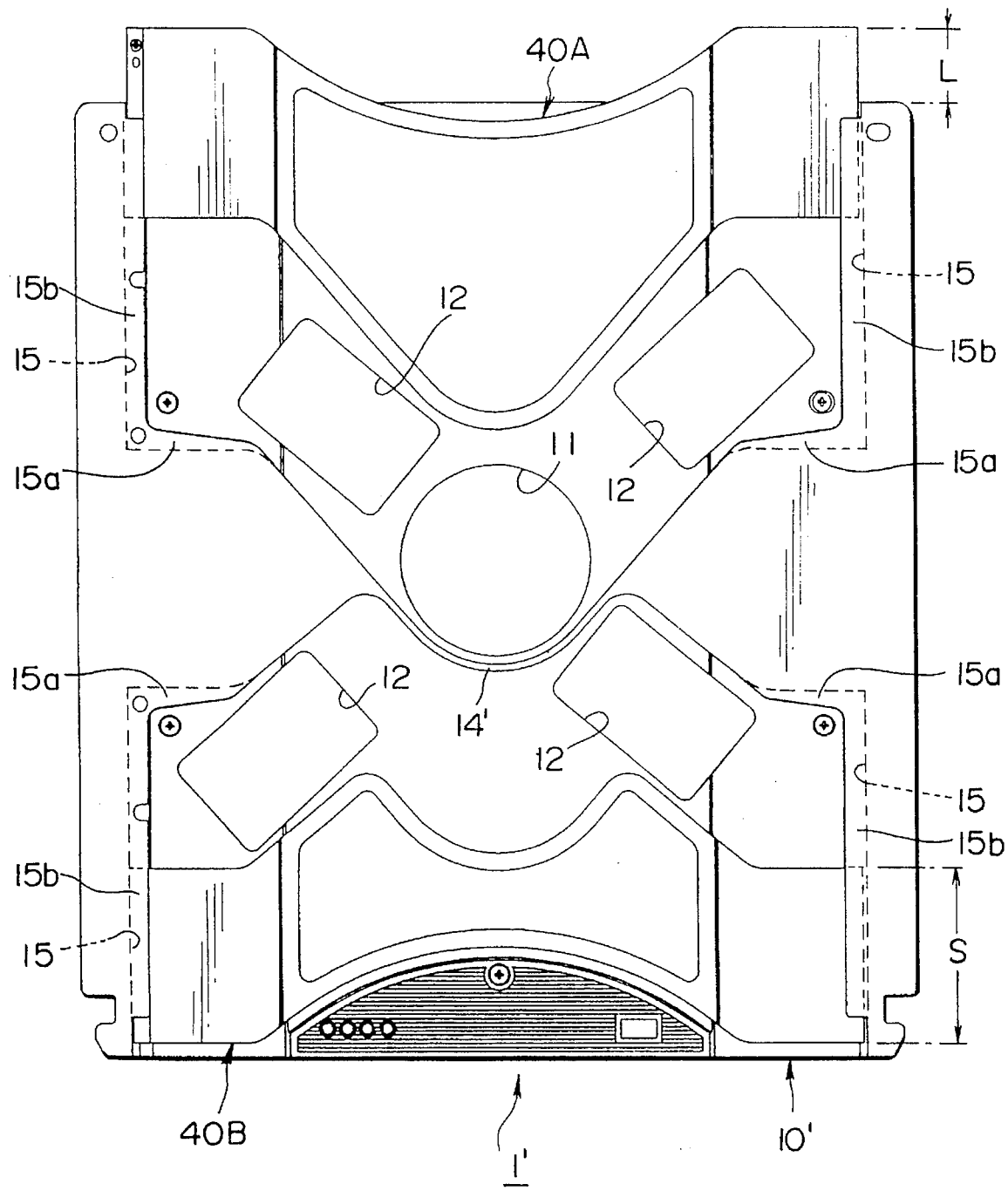
FIG. 22 is a bottom view of the disk cartridge shown in FIG. 20 with the shutters in the open positions.

FIGS. 20~22 show a disk cartridge 1' according to a second embodiment of the present invention. In the first embodiment, the front and rear shutters 40 are symmetrical with respect to the lateral center plane. In the cartridge 1' according to the second embodiment, front and rear shutters 40A and 40B are asymmetrical.

In this example, the center slider portion of the front shutter 40A has a convex inward edge while on the other hand the center slider portion of the rear shutter 40B has a concave inward edge as shown in FIGS. 21 and 22. A stopper 14' is a ridge (that is a long narrow raised portion) formed in the exterior surface of a lower shell 10'. In this example, the stopper 14' is formed on the rear side of the lateral center plane of the case. The stopper 14' extends curvedly in a circular arc around the center hole 11 in a manner of bilateral symmetry with respect to the longitudinal center plane (median) plane of the case. In the closed state of the shutters 40A and 40B, the convex inward edge of the front shutter 40A fits in the concave front side of the stopper 14', and the concave inward edge of the rear shutter 40B fits over the convex rear side of the stopper 14'. Thus, the front shutter 40A tightly closes the whole of the center hole 11 and the two pickup holes 12 on the front side while the rear shutter 40B covers the two pickup holes 12 on the rear side. In the open state as shown in FIG. 22, the amount of projection L of the front shutter 40A is slightly greater than that of the front shutter 40 shown in FIG. 17. In other respects, the disk cartridge 1' according to the second embodiment is substantially identical to the disk cartridge 1 according to the first embodiment.

The disk 30 rotatably encased in the disk cartridge according to the present invention may be an magneto optical disk having a diameter of 200 mm as in the illustrated examples, or may be a disk of some other type, such as a magnetic disk, on one side of which information can be recorded and erased.

What is claimed is:

1. A disk cartridge comprising:

a case enclosing a rotatable disk, the case comprising a first main side having a center hole that exposes a center of said rotatable disk, and a plurality of pickup holes that expose a plurality of regions of said rotatable disk;

first and second shutters for opening and closing said center hole and said pickup holes, said first and second shutters being slidably mounted on said case; and drive means for moving said first and second shutters away from each other and toward each other to open and close said center hole and said pickup holes, said drive means comprising a first slide rack slidably mounted in said case and connected with said first shutter, a second slide rack slidably mounted in said case and connected with said second shutter, and a pinion interposed between said first and second slide racks.

2. The disk cartridge of claim 1 wherein said pickup holes are arranged in two pairs radially around said center hole.

3. The disk cartridge of claim 1 wherein said disk is a magneto optical disk, and said case further comprises a second main side opposite to said first main side of said case, said second main side of said case being formed with a plurality of field grooves for receiving an external magnetic field for recording and erasing, the plurality of field grooves corresponding to the plurality of pickup holes, and being arranged so that each of said field grooves confronts a corresponding one of said pickup holes formed in said first main side of said case.

4. The disk cartridge of claim 1 wherein said case further comprises first and second shutter guide grooves formed in said first main side of said case, and each of said shutters comprises
a first lateral end inserted in said first guide groove, and fastened to one of said first and second slide racks, and a second lateral end inserted in said second guide groove, and engaged with an extraction preventing upright wall that projects from an interior surface of said second main side of said case toward said first main side.

5. The disk cartridge of claim 1 wherein said first and second shutters are symmetrical with respect to a lateral center plane which contains an axis of said center hole of said case, and which is perpendicular to a line extending from a front end of said case toward a rear end of said case along which said first and second racks extend.

6. The disk cartridge of claim 1 wherein:

said case further comprises a first outer groove extending from a front end of said case toward a rear end of said case;

said pinion is mounted on said case so that said pinion is rotatable on an axis which is stationary relative to said case, and said drive means comprises a pushing means which is mounted on a front portion of said first rack, and which comprises an outer arm projecting in said first outer groove through a slit formed in a bottom of said first outer groove, said pushing means pushing said first rack rearward toward said rear end of said case when said outer arm of said pushing means is moved in said slit along said first outer groove rearward toward said rear end of said case.

7. The disk cartridge of claim 6 wherein:

each of said shutters extends from a first lateral shutter end to a second lateral shutter end along a lateral direction from a first lateral side to a second lateral side of said case, said first rack comprising a rear portion fixed with said first lateral end of said first shutter, said second rack comprising a front portion fixed with said first lateral end of said second shutter, said second shutter being a front shutter, said first shutter being a rear shutter located between said front shutter and said rear end of said case;

said first main side of said case is formed with first and second front longitudinal slide guide grooves for slidably receiving said first and second lateral ends of said front shutter, respectively, first and second rear longitudinal slide guide grooves for slidably receiving said first and second lateral ends of said rear shutter, respectively, first and second front retaining grooves for receiving first and second rear edges of said front shutter, respectively, when said shutters are in closed positions, and first and second rear retaining grooves for receiving first and second front edges of said rear shutter, respectively, when said shutters are in the closed positions, said first front and rear retaining grooves extending between said first lateral side of said case and said center hole, said second front and rear retaining grooves extending laterally between said second lateral side of said case and said center hole, said first and second front retaining grooves opening forward toward the front end of said case, and said first and second rear retaining grooves opening rearward toward said rear end of said case.

8. The disk cartridge of claim 7 wherein said drive means further comprises a lock lever which is mounted on said case, and which comprises a forward end which is engaged in a lock recess formed in said front portion of said first rack to make said first rack immovable rearward toward said rear end of said case when said first rack is in a foremost position to close said first shutter, and a coil spring disposed between said first rack and said case for applying a spring force to pull said first rack toward the foremost position; and said pushing means further comprises a release lever which is swingably mounted on said front portion of said first rack, and which comprises said outer arm and an inner arm for pushing said forward end of said lock lever to disengage said lock lever from said lock recess of said first rack when said outer arm is pushed rearward while said first rack is in the foremost position.

9. The disk cartridge of claim 8 wherein said case has an approximate shape of a thin rectangular parallelepiped, and said first main side extends over a first circular flat surface of said disk, said case further comprises a second main side extending over a second circular flat surface of said disk, said first and second lateral sides standing upright between said first and second main sides, and extending from the front end to the rear end of the case, said disk being placed between said first and second main sides so that an axis of said disk extends substantially along a vertical direction of said case which is perpendicular to said surface of said disk, said first lateral side is formed with said first outer groove, and said first and second racks are placed between said first lateral side of said case and said disk, and said second rack extends from said front end of said case toward said rear end of said case between said first rack and said second lateral side of said case.

10. The disk cartridge of claim 9 wherein a vertical center line of said case is a center line of said center hole, and substantially coincides with an axis of rotation of said disk, a longitudinal center plane of said case is a plane containing said vertical center line, and extends from said front end of said case toward said rear end of said case, a lateral center plane of said case is a plane intersecting said longitudinal center plane at right angles along said vertical center line, each of said retaining grooves comprises an oblique groove section extending from an outer end point to an inner end point which is closer to said longitudinal center plane than said outer end point, and which is closer to said lateral center plane than said outer end point, each of said first and second rear edges of said front shutter, and each of said first and second front edges of said rear shutter comprises an oblique shutter edge section which extends from an outer end point to an inner end point and which is received in said oblique groove section of a corresponding one of said retaining grooves when said shutters are in a closed state, said outer end point of each shutter edge moves in an outer straight line through said outer end point of the corresponding one of said retaining grooves, and said inner end point of each shutter edge moves in an inner straight line through said inner end point of the corresponding one of said retaining grooves, a distance between said inner end point of each oblique groove section and said inner end point of the corresponding one of said shutter edges along said inner straight line being greater than a distance between said outer end point of the oblique groove section and said outer end point of the corresponding one of said shutter edges along said outer straight line when said shutters are in an open state.

11. The disk cartridge of claim 10 wherein said case further comprises a second outer groove formed in said second lateral side of said case, a first outer channel for slidably receiving a main portion of said first rack, a first inner channel for slidably receiving said second rack, and a second outer channel extending between said second outer groove and said second longitudinal slide guide groove, said drive means further comprises a dummy slider which is slidably received in said second outer channel, and which comprises an outer projection projecting from a front portion of said dummy slider into said second outer groove through a slit formed in a bottom of said second outer groove, and a coil spring disposed between said dummy slider and said case for applying a spring force to pull said dummy slider forward toward said front end of said case, said first main side of said case comprises a lower cover wall comprising an interior surface facing toward said disk, said second main side of said case comprises an upper cover wall comprising an interior surface facing toward said disk, said case further comprises front and rear extraction preventing upright walls that each project vertically from said interior surface of said upper cover wall toward said interior surface of said lower cover wall and terminating at a wall end which confronts said interior surface of said lower cover plate across a narrow gap between the wall end and said interior surface of said lower cover wall, and said second lateral shutter end of each shutter comprises a horizontal portion which is slidably fit in a corresponding one of said narrow gaps of said case, and a vertical flange extending along a corresponding one of said extraction preventing walls toward said upper cover plate.

12. The disk cartridge of claim 10 wherein said case further comprises first and second stopper projections which are located on both sides of said center hole in such positions that said lateral center plane bisects each of said stopper projections, and each of said shutters comprises first and second abutment surfaces which abut on said first and second stopper projections, respectively, when said shutters are in the closed state.

13. The disk cartridge of claim 12 wherein said front and rear shutters are substantially symmetrical with respect to said lateral center plane, said front shutter comprises a straight rear middle edge extending in parallel to said lateral center plane, said rear shutter comprises a straight front middle edge extending in parallel to said lateral center plane, and said straight rear middle edge of said front shutter and said straight front middle edge of said rear shutter extend laterally between said first and second stopper projections with a limited space between said front and rear middle edges of said shutters when said shutters are in the closed state.

14. The disk cartridge of claim 10 wherein one of said front and rear shutters comprises a convex middle portion which covers said center hole entirely when said shutters are in the closed state.

15. The disk cartridge of claim 14 wherein said case further comprises a stopper ridge extending in a shape of a circular arc around said center hole on a rear side of said center hole, a concave side surface facing toward the front end of said case, and a convex side surface facing toward the rear end of said case, said front shutter comprises a convex rear middle edge which fittingly abuts on said concave side surface of said stopper ridge when said shutters are in the closed state, and said rear shutter comprises a concave front middle edge which fittingly abuts on said convex side surface of said stopper ridge.

16. The disk cartridge of claim 6 wherein said case further comprises a second main side, said disk being enclosed between said first and second main sides of said case, said second main side being formed with a plurality of field grooves for receiving a magnetic field for recording and erasure, each of said field grooves comprising a bottom depressed from an exterior surface of said second main side of said case toward said disk.

17. The disk cartridge of claim 16 wherein said pickup holes are arranged and extended radially around said center hole in said first main side of said case, the plurality of field grooves corresponds to the plurality of pickup holes, and are arranged so that each of said field grooves confronts a corresponding one of said pickup holes, each of said field grooves extending radially around a center line of said center hole, said second main side comprises a cover wall extending over said disk, and a wall thickness of said bottom of each of said field grooves is smaller than a wall thickness of said cover wall of said second main side.

18. The disk cartridge of claim 17 wherein the plurality of said pickup holes comprises a first pair of said pickup holes aligned in a first oblique line extending from a first side of said case to a second side of said case, and passing through the center line of said center hole in a horizontal plane parallel to a rotating plane of said disk, and a second pair of said pickup holes aligned in a second oblique line extending from the first side of said case to the second side of said case, and intersecting said first oblique line at the center line of said center hole in said horizontal plane, said center hole being located between said pickup holes of said first pair in said first oblique line, and between said pickup holes of said second pair in said second oblique line.

* * * * *